US009190915B2

(12) United States Patent
Inoue

(10) Patent No.: US 9,190,915 B2
(45) Date of Patent: Nov. 17, 2015

(54) ELECTRIC-POWER CONVERSION DEVICE

(71) Applicant: Mitsubishi Electric Corporation, Chiyoda-ku (JP)

(72) Inventor: Sadayuki Inoue, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/413,274

(22) PCT Filed: Jun. 11, 2013

(86) PCT No.: PCT/JP2013/066081
§ 371 (c)(1),
(2) Date: Jan. 7, 2015

(87) PCT Pub. No.: WO2014/024560
PCT Pub. Date: Feb. 13, 2014

(65) Prior Publication Data
US 2015/0138843 A1 May 21, 2015

(30) Foreign Application Priority Data
Aug. 8, 2012 (JP) ................................. 2012-175783

(51) Int. Cl.
*H02M 7/797* (2006.01)
*H02M 3/335* (2006.01)

(52) U.S. Cl.
CPC ...... *H02M 3/33507* (2013.01); *H02M 3/33584* (2013.01)

(58) Field of Classification Search
CPC ......... H02M 7/48; H02M 7/483; H02M 7/66; H02M 7/72; H02M 7/79; H02M 7/797; H02M 2011/007
USPC .......................... 363/95, 97, 98; 323/266, 906
See application file for complete search history.

(56) References Cited

U.S. PATENT DOCUMENTS 6,081,104 A * 6/2000 Kern .............................. 323/268
7,064,967 B2 * 6/2006 Ichinose et al. ............. 363/56.01

(Continued)

FOREIGN PATENT DOCUMENTS

JP 3697112 B2 9/2005
WO WO 2013/118336 A1 8/2013

OTHER PUBLICATIONS

International Search Report issued Jul. 23, 2013 in PCT/JP2013/066081 Filed Jun. 11, 2013.
Office Action issued May 18, 2015 in German Patent Application No. 11 2013 003 974.5 (with partial English translation).

(Continued)

*Primary Examiner* — Gary L Laxton
(74) *Attorney, Agent, or Firm* — Oblon, McClelland, Maier & Neustadt, L.L.P.

(57) ABSTRACT

A DC/DC conversion circuit is configured with a first power converter and a second power converter that are connected through an insulation transformer, and performs power transition bidirectionally between two DC-voltage sources. In the case of charging the DC-voltage source in the side where the second power converter is placed, a control is made using a first rectifier-control mode in which the first power converter is placed under an output variable control according to an inverter operation and the second power converter is operated according to a rectifier operation. Then, when a charging current becomes an upper limit value or more, a control is made by switching the mode to a first inverter-control mode in which the first power converter is placed under an output fixed control according to the inverter operation and the second power converter is placed under an output variable control according to the inverter operation.

14 Claims, 18 Drawing Sheets

(56) References Cited

U.S. PATENT DOCUMENTS

| | | | |
|---|---|---|---|
| 7,733,670 B2* | 6/2010 | Feng et al. | 363/17 |
| 8,259,479 B2* | 9/2012 | Wagoner et al. | 363/97 |
| 8,456,878 B2* | 6/2013 | Min | 363/95 |
| 8,558,510 B2* | 10/2013 | Moon | 320/134 |
| 8,861,230 B2* | 10/2014 | Sigamani et al. | 363/34 |
| 2014/0327306 A1 | 11/2014 | Inoue | |

OTHER PUBLICATIONS

German G. Oggier, et al., "Extending the ZVS Operating Range of Dual Active Bridge High-Power DC-DC Converters" Power Electronics Specialists Conference, 2006 PESC '06 37$^{th}$ IEEE, Jun. 18-22, 2006, 7 Pages.

Amit Kumar Jain, "PWM Control of Dual Active Bridge: Comprehensive Analysis and Experimental Verification" IEEE Transactions on Power Electronics, vol. 26 No. 4, Apr. 2011, pp. 1215-1227.

* cited by examiner

FIG. 10
(a)
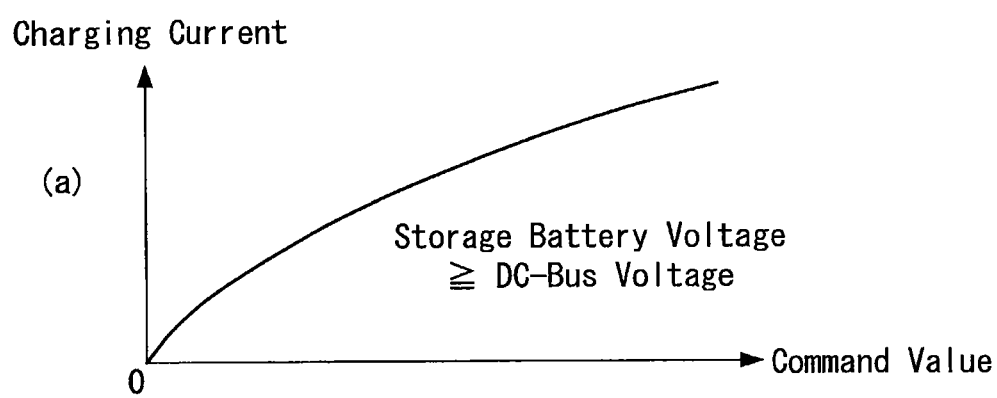
(b)
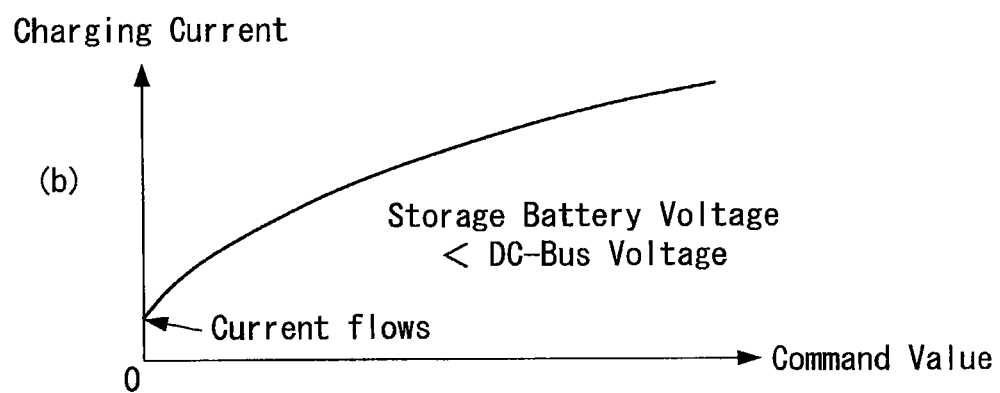

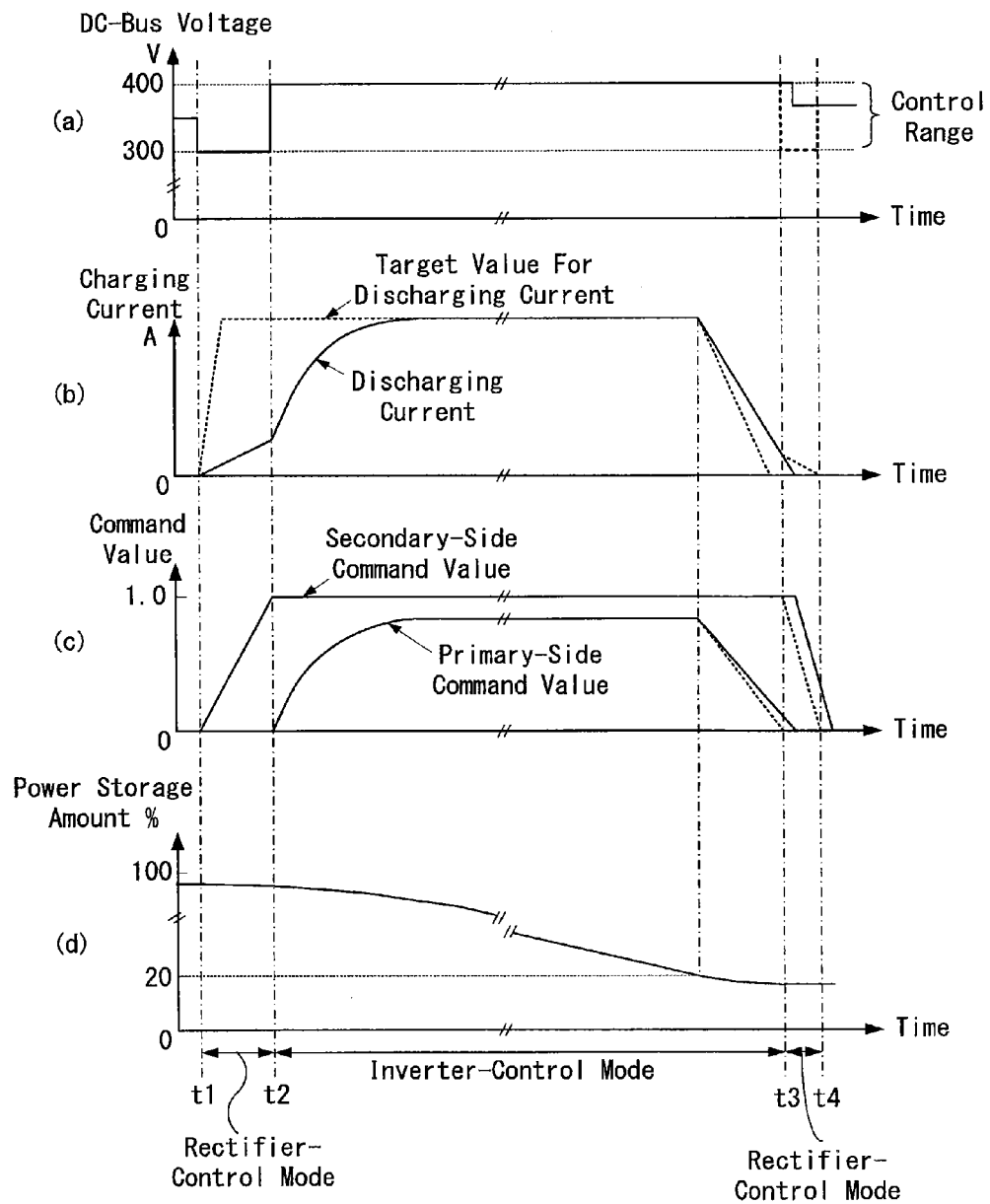

ELECTRIC-POWER CONVERSION DEVICE

TECHNICAL FIELD

The present invention relates to a power conversion device for performing DC-power conversion bidirectionally between mutually insulated DC-voltage sources.

BACKGROUND ART

In recent years, for the purpose of reducing environmental load, power generating systems utilizing natural energy, such as solar power generation systems without carbon dioxide emission, are spreading among respective homes. Meanwhile, for dealing with power shortage and the like, development/commercialization is proceeding on a system provided with a storage battery, a system utilizing an electric-powered vehicle as a storage battery, a system combining solar power generation and a storage battery, and the like. In the above systems, a lithium-ion battery is used in many cases as the storage battery.

For example, in Patent Document 1, there is disclosed a configuration and control technique of an insulated-type DC/DC conversion device provided with a storage battery as a secondary battery.

Specifically, in the case of charging the storage battery using power from a DC power source, an AC voltage is generated by a converter in the primary side (in the side where the DC power source is connected), and then the AC power is converted (diode-rectified) to DC power by a converter in the secondary side (in the side where the storage battery is connected) that is connected to the primary-side converter through a transformer. In contrast, in the case of discharging from the storage battery to the DC power source, an AC voltage is generated by the secondary-side converter and the AC power is converted (diode-rectified) to DC power by the primary-side converter.

Meanwhile, according to the power conversion device described in Patent Document 1, in the case of charging to the storage battery, for example, since an AC waveform supplied from the primary side is rectified by the converter connected in the secondary side, it is unable to supply power if a maximum amplitude of the AC waveform supplied to the secondary side is not higher than at least the battery voltage of the storage battery. Likewise, in the case of discharging from the storage battery to thereby supply power to the DC power source in the primary side, since an AC waveform supplied from the secondary side is rectified by the converter connected in the primary side, it is unable to supply power if a maximum amplitude of the AC waveform supplied from the secondary side is not higher than at least the voltage of the DC power source in the primary side.

Thus, in the power conversion device described in Patent Document 1, the turn ratio of the transformer placed between the primary-side and secondary-side converters is changed according to a direction of power supply (charging direction or discharging direction), to thereby control an amplitude of the AC voltage inputted to the converter in the power-supply reception side so as to be higher than the DC output voltage of the converter in the power-supply reception side.

CITATION LIST

Patent Document

Patent Document 1: Japanese Patent No. 3697112

SUMMARY OF THE INVENTION

Problems to be Solved by the Invention

As described above, in the power conversion device described in Patent Document 1, since the converter in the power supply side generates the AC power and the converter in the power demand side converts the inputted AC power to DC power, it is necessary to change the turn ratio of the transformer placed between the primary-side and secondary-side converters according to the direction of power supply.

Thus, there is a problem that the transformer becomes larger in size and also becomes higher in cost.

Furthermore, in the case of using, for example, a lithium-ion battery as the storage battery, this problem becomes more serious.

The battery voltage of lithium-ion battery varies depending on its power charged amount. In particular, the lithium-ion battery mounted in the electric-powered vehicle has a voltage of from two hundreds and several tens V to three hundreds and several tens V, as a normally usable range of the battery, and thus the battery voltage varies by 100V or more. When such a storage battery is used as a storage battery for a domestic power storage system, it is further necessary in the case of the power conversion system described in Patent Document 1 to make the voltage range variable (for example, from ½ to 2 times) in the process of voltage step-up/step-down by the transformer. This makes the structure of the transformer more complex, and this does not allow the transformer to be used at a maximum point of efficiency, resulting in increase in loss as well as in cost.

Accordingly, this invention has been made to solve the problems as described above, and an object thereof is to provide a power conversion device for exchanging electric power energy bidirectionally between two DC power sources insulated to each other through a transformer, that allows the transformer to be optimally used, that has no need of changing the turn ratio of the transformer according to the direction of power supply or the voltages of the two DC power sources, and that is low-cost and low-loss.

Means for Solving the Problems

A power conversion device of the invention comprises: a first power converter and a second power converter each having switching devices, and each capable of an inverter operation for performing bidirectional DC/AC conversion by on/off driving the switching devices and a rectifier operation for converting an alternating current to a direct current by turning off the switching devices; an insulation transformer that connects an AC-side terminal of the first power converter with an AC-side terminal of the second power converter; and a control circuit that controls the first and second power converters; said power conversion device performing bidirectional DC-power conversion between a first DC-voltage source to which a DC-side terminal of the first power converter is connected and a second DC-voltage source to which a DC-side terminal of the second power converter is connected.

The control circuit includes four control modes of a first rectifier-control mode, a first inverter-control mode, a second rectifier-control mode, and a second inverter-control mode. At the time of supplying power from the first DC-voltage source to the second DC-voltage source, the control circuit utilizes the first rectifier-control mode in which the first power converter is placed under an output variable control according to the inverter operation while the second power converter is controlled to be according to the rectifier operation, and when a command value for controlling the first power converter becomes a first setup value or more, the control circuit switches the mode to the first inverter-control mode in which the first power converter is placed under an output fixed control according to the inverter operation while the second power converter is placed under an output variable control according to the inverter operation. Meanwhile, at the time of supplying power from the second DC-voltage source to the first DC-voltage source, the control circuit utilizes the second rectifier-control mode in which the second power converter is placed under an output variable control according to the inverter operation while the first power converter is controlled to be according to the rectifier operation, and when a command value for controlling the second power converter becomes a second setup value or more, the control circuit switches the mode to the second inverter-control mode in which the second power converter is placed under an output fixed control according to the inverter operation while the first power converter is placed under an output variable control according to the inverter operation.

Effect of the Invention

Since the power conversion device of this invention is configured as described above, the turn ratio of the insulation transformer can be fixed, and the insulation transformer can be used optimally. Thus, it is possible to reduce the size and cost of the insulation transformer and to suppress unwanted power loss to thereby enhance the power conversion efficiency.

BRIEF DESCRIPTION OF THE DRAWINGS

FIG. 10 is graphs each showing a relationship between a control command value and a charging current at the time of charging a storage battery by an inverter-control mode according to Embodiment 1.

FIG. 18 is timing charts each for illustrating an operation of the DC/DC control circuit 14 shown in FIG. 3 at the time of discharging, according to Embodiment 1.

MODES FOR CARRYING OUT THE INVENTION

Embodiment 1

Figure 1:
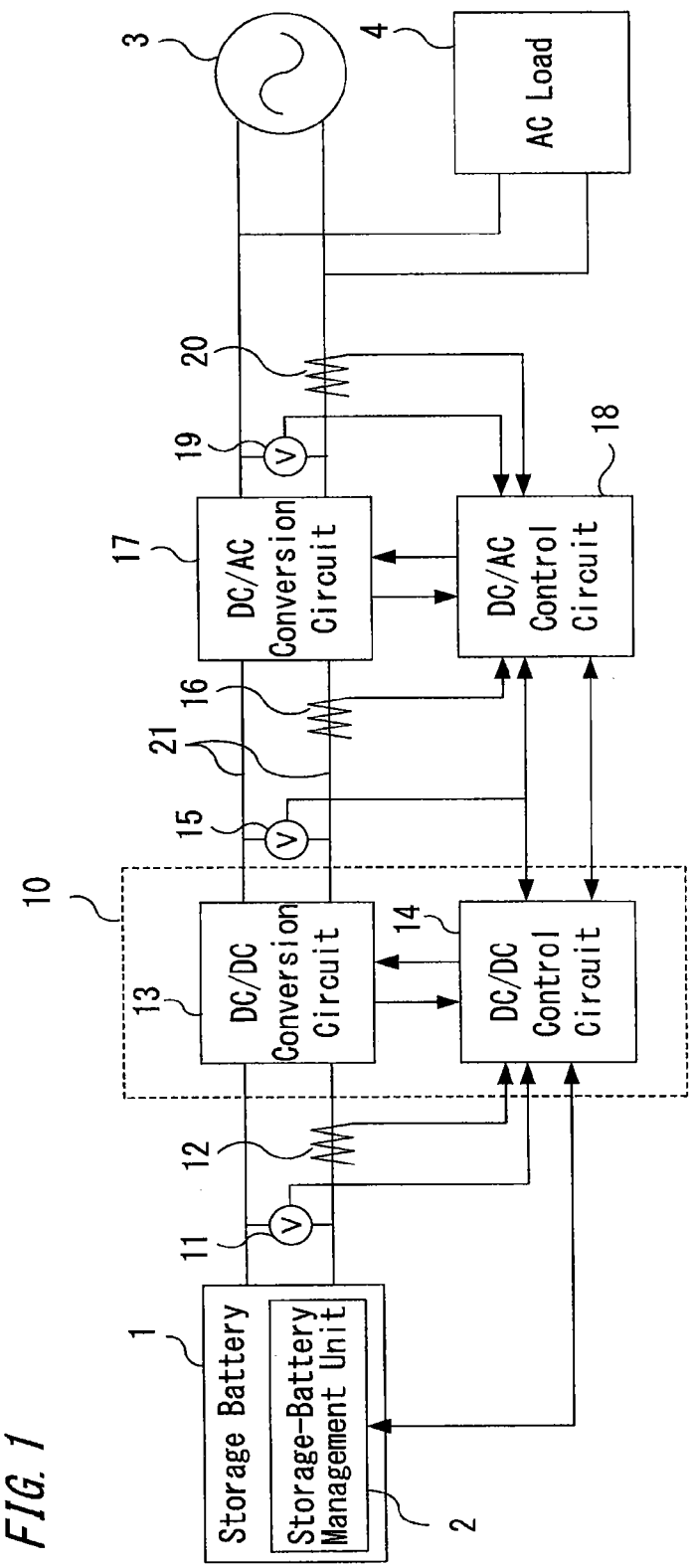
FIG. 1 is a diagram schematically showing a system configuration of a power conversion device according to Embodiment 1 of the invention.

FIG. 1 is a system configuration diagram of a power conversion device according to Embodiment 1 of the invention. In the figure, a power conversion device 10 is connected between a DC/AC conversion circuit 17 that is a first DC-voltage source and a storage battery 1 that is a second DC-voltage source, and includes a DC/DC conversion circuit 13 and a DC/DC control circuit 14 as a control circuit for controlling the DC/DC conversion circuit 13, details of which are described later.

The storage battery 1 includes a storage-battery management unit 2 for managing its characteristics, such as, a power storage amount of the storage battery 1, an internal temperature of the storage battery 1, an SoC (State of Charge) and the like.

The DC/AC conversion circuit 17 converts a voltage of a DC-line bus 21 (DC-bus voltage) outputted from the DC/DC conversion circuit 13 to AC power, and outputs it to a power system 3 and an AC load 4. Also, the DC/AC conversion circuit 17 can convert AC power supplied from the power system 3 to DC power to thereby charge, as the first DC-voltage source, the storage battery 1 through the DC/DC conversion circuit 13.

A DC/AC control circuit 18 controls the DC/AC conversion circuit 17, thus serving a function as a DC-voltage control circuit for controlling the DC-bus voltage.

Moreover, there are provided a voltmeter 11 for measuring an output voltage of the storage battery 1, an ammeter 12 for measuring a current outputted from the storage battery 1, a voltmeter 15 for measuring the DC-bus voltage outputted from the DC/DC conversion circuit 13, an ammeter 16 for measuring a current outputted from the DC/DC conversion circuit 13, a voltmeter 19 for measuring an AC voltage outputted from the DC/AC conversion circuit 17, and an ammeter 20 for measuring an alternating current outputted from the DC/AC conversion circuit 17.

Figure 2:
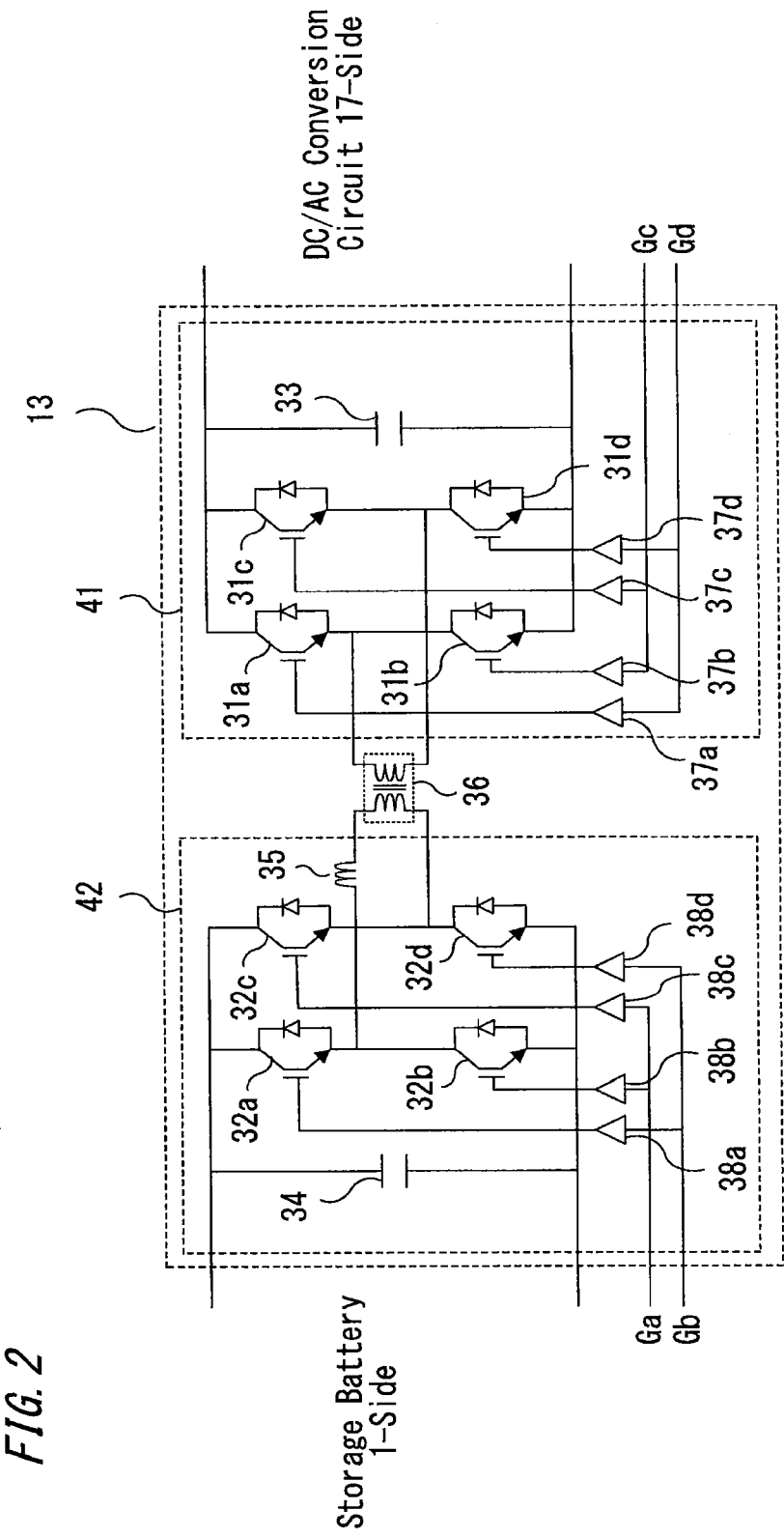
FIG. 2 is a diagram schematically showing a configuration of a DC/DC conversion circuit 13 shown in FIG. 1.

FIG. 2 is a diagram showing a circuit configuration example of the DC/DC conversion circuit 13 of FIG. 1. In the figure, the DC/DC conversion circuit 13 includes a first power converter 41 whose DC-side terminal is connected to a DC-side terminal of the DC/AC conversion circuit 17, a second power converter 42 whose DC-side terminal is connected to the storage battery 1, and an insulation transformer 36. The primary winding of the insulation transformer 36 is connected to an AC-side terminal of the first power converter 41, and the secondary winding electrically insulated from the primary winding is connected to an AC-side terminal of the second power converter 42 through a reactor 35.

The first power converter 41 is configured in two arms, and includes four switching devices 31*a* to 31*d* serving for a rectifier operation and an inverter operation which will be detailed in a later stage, level-conversion buffers 37*a* to 37*d*, and a capacitor 33. The level-conversion buffers 37*a* to 37*d* are provided for converting each signal level of the control signals supplied to the switching devices 31*a* to 31*d*, to a predetermined level. Further, the capacitor 33 smooths the output power from the DC/AC conversion circuit 17.

The second power converter 42 is configured in two arms, and includes four switching devices 32*a* to 32*d* serving for a rectifier operation and an inverter operation which will be detailed in a later stage, level-conversion buffers 38*a* to 38*d*, and a capacitor 34. The level-conversion buffers 38*a* to 38*d* are provided for converting each signal level of the control signals supplied to the switching devices 32*a* to 32*d*, to a predetermined level. Further, the capacitor 34 smooths the output power of the storage battery 1.

Note that, as to any of the switching devices 31*a* to 31*d* and 32*a* to 32*d*, its on-off operation is controlled using a Duty ratio as a command value, as described later.

Besides, the first and second power converters 41,42 become capable of an inverter operation for performing bidirectional DC/AC conversion when the switching devices 31*a* to 31*d* and 32*a* to 32*d* are on/off driven, respectively, based on each command value of the Duty ratio, and become capable of a rectifier operation for converting an alternating current to a direct current when the switching devices 31*a* to 31*d* and 32*a* to 32*d* are turned off (corresponding to Duty ratio=0%), respectively. Note that this inverter operation and rectifier operation will be further mentioned in a later stage.

Figure 3:
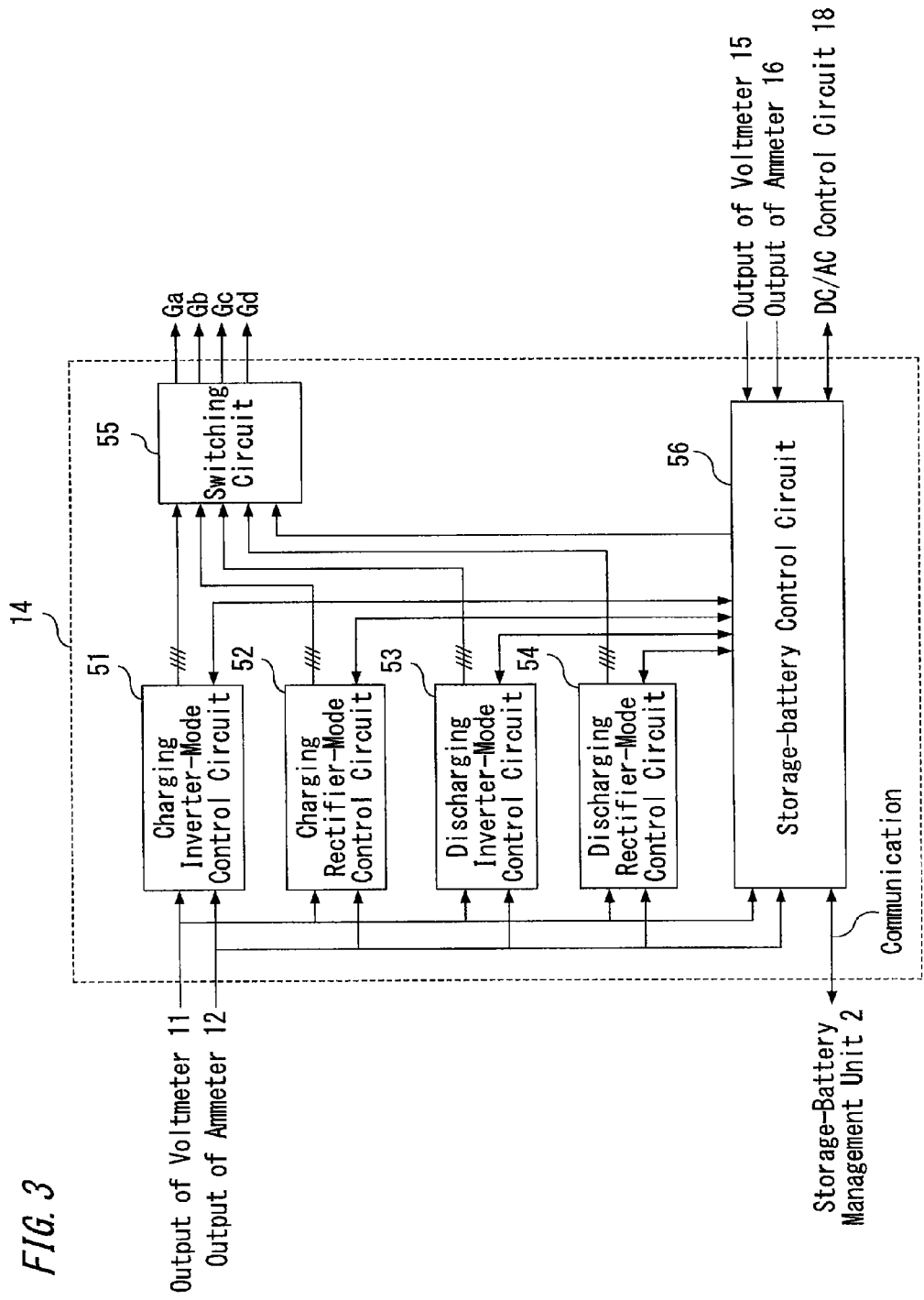
FIG. 3 is a block diagram schematically showing an internal configuration of a DC/DC control circuit 14 shown in FIG. 1.

FIG. 3 is a block diagram showing an internal configuration example of the DC/DC control circuit 14 of FIG. 1. In the figure, the DC/DC control circuit 14 includes: a charging inverter-mode control circuit 51 that outputs control signals (PWM signals) Ga to Gd for controlling supplying of charging power to the storage battery 1 by a first inverter-control mode; a charging rectifier-mode control circuit 52 that outputs control signals (PWM signals) Ga to Gd for controlling supplying of charging power to the storage battery 1 by a first rectifier-control mode; a discharging inverter-mode control circuit 53 that outputs control signals (PWM signals) Ga to Gd for controlling supplying of discharging power from the storage battery 1 by a second inverter-control mode; and a discharging rectifier-mode control circuit 54 that outputs control signals (PWM signals) Ga to Gd for controlling supplying of discharging power from the storage battery 1 by a second rectifier-control mode.

The DC/DC control circuit 14 further includes a switching circuit 55 for performing switching between the respective control circuits 51 to 54, and a storage-battery control circuit 56 that executes selection of a control target value at the time of controlling the storage battery 1, a control algorism and the like.

Although the details of the control modes of the respective control circuits 51 to 54 will be described later, these circuits each generate command values A to D of the Duty ratios as the control command values, to thereby output the control signals Ga to Gd on the basis of the command values A to D.

Then, the switching devices 32*b*, 32*c* of the second power converter 42 are drive-controlled by the control signal Ga based on the command value A, and the switching devices 32*a*, 32*d* of the second power converter 42 are drive-controlled by the control signal Gb based on the command value B. Further, the switching devices 31*b*, 31*c* of the first power converter 41 are drive-controlled by the control signal Gc based on the command value C, and the switching devices 31*a*, 31*d* of the first power converter 41 are drive-controlled by the control signal Gd based on the command value D.

Next, a specific operation of the power conversion device of Embodiment 1 will be described using FIG. 1 to FIG. 18. Note that in Embodiment 1, description is made about a case where power is properly supplied from the power system 3 to the power conversion device (at the time of normal operation).

First, description will be made about a control in the case of charging the storage battery 1 by the power conversion device, that is, in the case where power is supplied from the DC/AC conversion circuit 17 that is the first DC-voltage source to the storage battery 1 that is the second DC-voltage source, using power from the power system 3.

Figure 4:
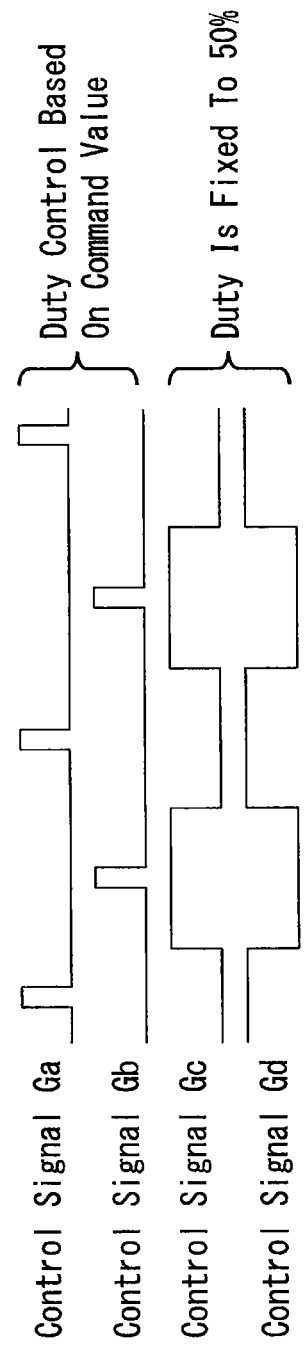
FIG. 4 is a diagram showing waveform examples of control signals at the time of charge controlling by a first inverter-control mode of the DC/DC conversion circuit 13 shown in FIG. 2.

FIG. 4 shows waveforms of the control signals respectively supplied to the switching devices 31*a* to 31*d* and 32*a* to 32*d* in the case where the DC/DC conversion circuit 13 shown in FIG. 2 is charge-controlled in the first inverter-control mode by the charging inverter-mode control circuit 51.

The inverter control mode at the time of charging (first inverter-control mode) is generally a control method to be used when the DC-bus voltage of the DC-line bus 21 is lower than the battery voltage of the storage battery 1. In this case, power can be supplied from the power source with a low DC voltage to the power source with a high DC voltage by an operation of feeding electric power energy once stored in the reactor 35 into the storage battery 1. Note that in the inverter-control mode, power can be supplied also from the power source with a high DC voltage to the power source with a low DC voltage. Additional description of this control mode will be given later.

As shown in FIG. 4, the switching devices 31*a* to 31*d* of the first power converter 41 are driven with a Duty ratio of 50% to thereby generate AC power. In controlling the first power converter 41, the command value C,D are fixed to the Duty ratio 50%, so that the control signal Gc and the control signal Gd are the same in length of "H" period. In contrast, the switching devices 32*a* to 32*d* of the second power converter 42 are driven by the control signals Ga,Gb based on the variably-generated command values A,B, to thereby control the charging power (charging current).

Note that operations by the first and second power converters 41,42 in which power conversion between a direct current and an alternating current is made by on/off switching their respective switching devices 31*a* to 31*d* and 32*a* to 32*d*, are each referred to as an inverter operation. Further, a control with the command value being fixed is referred to as an output fixed control, and a control with the command value variably generated through calculation is referred to as an output variable control. That is, in the inverter-control mode at the time of charging shown in FIG. 4, the first power converter 41 is controlled under the output fixed control according to the inverter operation, and the second power converter 42 is controlled under the output variable control according to the inverter operation.

Figure 5:
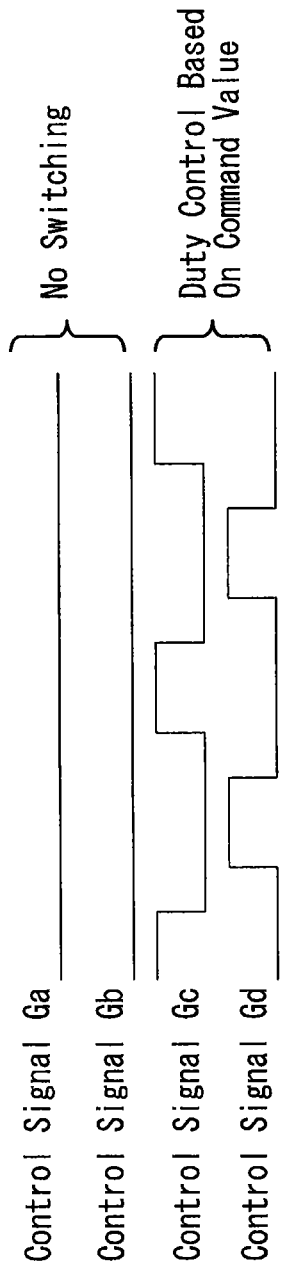
FIG. 5 is a diagram showing waveform examples of control signals at the time of charge controlling by a first rectifier-control mode of the DC/DC conversion circuit 13 shown in FIG. 2.

FIG. 5 shows waveforms of the control signals respectively supplied to the switching devices 31a to 31d and 32a to 32d in the case where the DC/DC conversion circuit 13 shown in FIG. 2 is charge-controlled in the first rectifier-control mode by the charging rectifier-mode control circuit 52.

The rectifier-control mode at the time of charging (first rectifier-control mode) is a control method to be used when the DC-bus voltage of the DC-line bus 21 is higher than the battery voltage of the storage battery 1.

As shown in FIG. 5, the switching devices 31a to 31d of the first power converter 41 are driven by the control signals Gc,Gd based on the generated command values C,D, that is, the first power converter 41 is controlled under the output variable control according to the inverter operation, to thereby generate AC power. In contrast, the switching devices 32a to 32d of the second power converter 42 are prevented from switching by fixing their nodes to OFF. By controlling in this manner, the respective switching devices 32a to 32d of the second power converter 42 act as diode switches that rectify the AC power.

Note that operations by the first and second power converters 41,42 in which conversion from an alternating current to a direct current is made by fixing to OFF the nodes of their respective switching devices 31a to 31d and 32a to 32d, are each referred to as a rectifier operation.

In the rectifier-control mode at the time of charging shown in FIG. 5, the first power converter 41 is controlled under the output variable control according to the inverter operation and the second power converter 42 is controlled to be according to the rectifier operation.

Note that the charging control by the first rectifier-control mode is configured as described above, it is unable to supply power when the DC-bus voltage of the DC-line bus 21 is lower than the battery voltage of the storage battery 1. In contrast, in the case of the charging control by the first inverter-control mode, as described previously, it is possible to supply power even when the DC-bus voltage of the DC-line bus 21 is higher than the battery voltage of the storage battery 1.

Further, in the first-rectifier control mode, since the switching devices 32a to 32d perform no switching but are used as a diode rectifier, switching losses of the switching devices 32a to 32d are reduced. This makes it possible to convert power more efficiently than in the first inverter-control mode.

Accordingly, in Embodiment 1, there is provided a configuration that makes it possible to suppress unwanted power-conversion loss to thereby efficiently control charging/discharging of the storage battery 1, by suppressing unwanted charging/discharging control by the inverter-control mode, as described later.

Next, description will be made about a control in the case of discharging the storage battery 1 by the power conversion device, that is, in the case where power in the storage battery 1 that is the second DC-voltage source is supplied to the power system 3 and the AC load 4 through the DC/AC conversion circuit 17 that is the first DC-voltage source.

Figure 6:
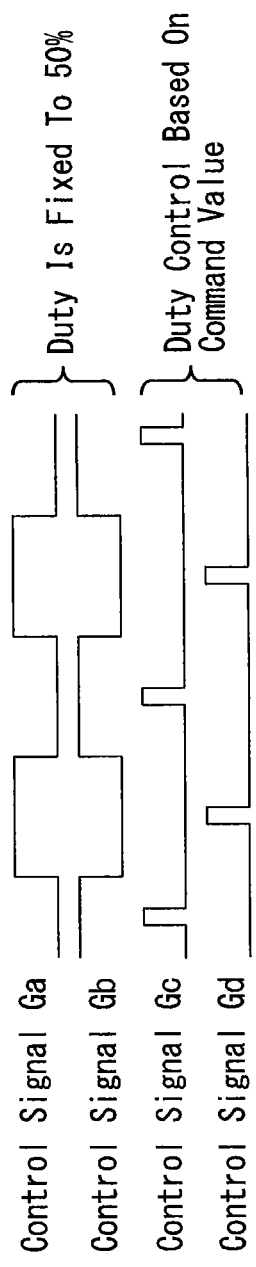
FIG. 6 is a diagram showing waveform examples of control signals at the time of discharge controlling by a second inverter-control mode of the DC/DC conversion circuit 13 shown in FIG. 2.

FIG. 6 shows waveforms of the control signals respectively supplied to the switching devices 31a to 31d and 32a to 32d in the case where the DC/DC conversion circuit 13 shown in FIG. 2 is discharge-controlled in the second inverter-control mode by the discharging inverter-mode control circuit 53.

The inverter control mode at the time of discharging (second inverter-control mode) is a control method to be used when the DC-bus voltage of the DC-line bus 21 is higher than the battery voltage of the storage battery 1.

As shown in FIG. 6, the switching devices 32a to 32d of the second power converter 42 are driven with a Duty ratio of 50% to thereby generate AC power. In controlling the second power converter 42, the command value A,B are fixed to the Duty ratio 50%, so that the control signal Ga and the control signal Gb are the same in length of "H" period. In contrast, the switching devices 31a to 31d of the first power converter 41 are driven by the control signals Gc,Gd based on the variably-generated command valued C,D, to thereby control the discharging power.

That is, in the inverter-control mode at the time of discharging shown in FIG. 6, the second power converter 42 is controlled under the output fixed control according to the inverter operation, and the first power converter 41 is controlled under the output variable control according to the inverter operation.

Figure 7:
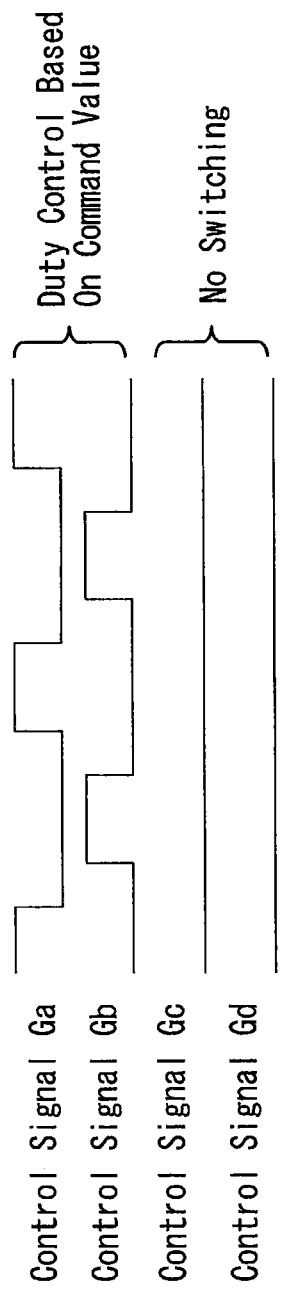
FIG. 7 is a diagram showing waveform examples of control signals at the time of discharge controlling by a second rectifier-control mode of the DC/DC conversion circuit 13 shown in FIG. 2.

FIG. 7 shows waveforms of the control signals respectively supplied to the switching devices 31a to 31d and 32a to 32d in the case where the DC/DC conversion circuit 13 shown in FIG. 2 is discharge-controlled in the second rectifier-control mode by the discharging rectifier-mode control circuit 54.

The rectifier-control mode at the time of discharging (second rectifier-control mode) is a control method to be used when the DC-bus voltage of the DC-line bus 21 is lower than the battery voltage of the storage battery 1.

As shown in FIG. 7, the switching devices 32a to 32d of the second power converter 42 are driven by the control signals Ga,Gb based on the generated command values A,B, that is, the second power converter 42 is controlled under the output variable control according to the inverter operation, to thereby generate AC power. In contrast, the switching devices 31a to 31d of the first power converter 41 are prevented from switching by fixing their nodes to OFF. By controlling in this manner, the respective switching devices 31a to 31d of the first power converter 41 act as diode switches that rectify the AC power.

That is, in the rectifier-control mode at the time of discharging shown in FIG. 7, the second power converter 42 is controlled under the output variable control according to the inverter operation, and the first power converter 41 is controlled to be according to the rectifier operation.

Note that the discharging control by the second rectifier-control mode is configured as described above, it is unable to supply power when the DC-bus voltage of the DC-line bus 21 is higher than the battery voltage of the storage battery 1. In contrast, in the case of the discharging control by the second inverter-control mode, it is possible to supply power even when the DC-bus voltage of the DC-line bus 21 is lower than the battery voltage of the storage battery 1.

Figure 8:
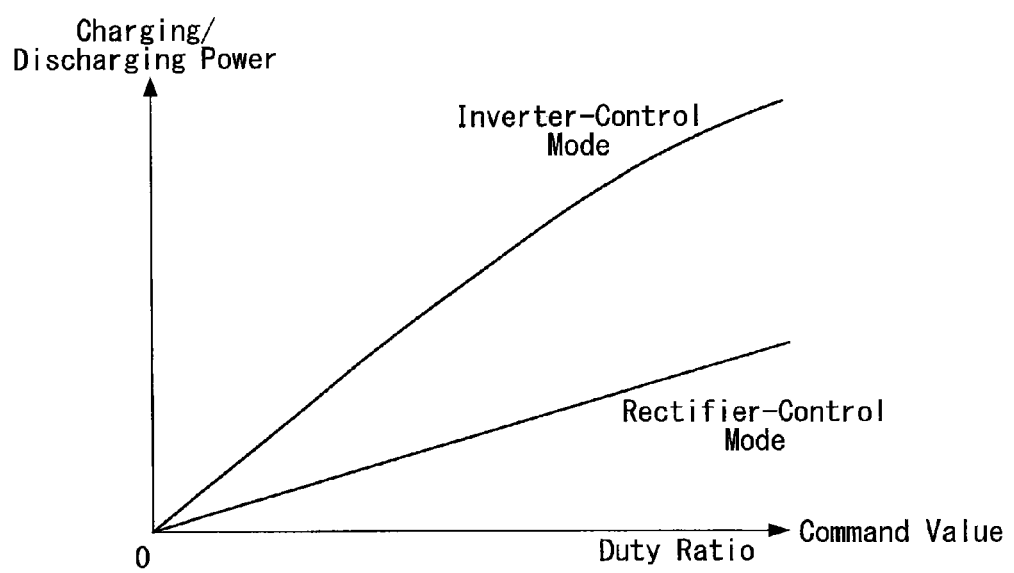
FIG. 8 is a graph showing a relationship between a command value at the time of outputting the control signals shown in FIG. 4 to FIG. 7 and charged/discharged power, according to Embodiment 1.

FIG. 8 shows a relationship between a Duty ratio that is a control command value (hereinafter, simply referred to as a command value) at the time of the inverter control mode and the rectifier-control mode, and power at the time of charging/discharging. Note that the difference between the first inverter-control mode and the second inverter-control mode resides only in power transition direction that is a charging/discharging direction, so that each of these will be simply referred to as the inverter-control mode unless the charging/discharging direction is to be particularly specified therefor. Likewise, the difference between the first rectifier-control mode and the second rectifier-control mode resides only in a charging/discharging direction, so that each of these will be simply referred to as the rectifier-control mode unless the charging/discharging direction is to be particularly specified therefor.

As shown in the figure, although large amount of power can be exchanged in the case of using the inverter-control mode, the power responds sensitively to a change in the command value. Further, although the power responds moderately to a change in the command value in the case of the rectifier-control mode, the amount of suppliable power is smaller than in the inverter-control mode.

Figure 9:
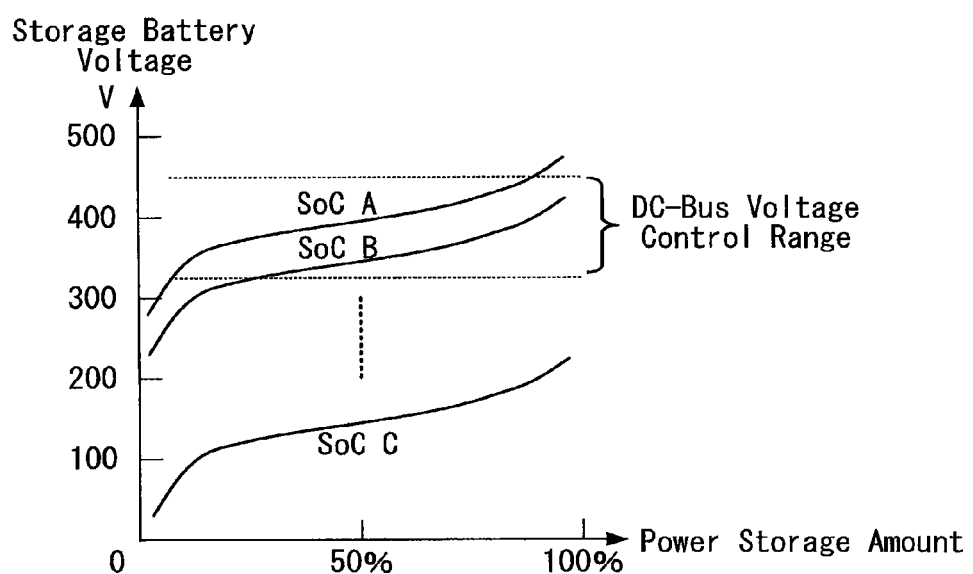
FIG. 9 is a graph showing a relationship between a power storage amount of each storage battery and a voltage of the storage battery.

FIG. 9 shows a relationship between a voltage of each storage battery and a power storage amount (hereinafter, indicated as SoC). As shown in the figure, there are a variety of characteristics in the batteries. For example, the SoC of the battery mounted in an electric-powered vehicle is different depending on a type of the vehicle. Further, although power conversion devices that incorporate storage batteries have been put on sale, the SoC of the storage battery is different for each of the makers.

In Embodiment 1, a control method of the DC/DC conversion circuit 13 that is applicable in the case where a plurality of storage batteries (for example, a storage battery mounted in the electric-power vehicle and a stationary storage battery that are different in SoC) is connected thereto will be described below. Note that in the figure, an area indicated as a DC-bus voltage control range represents a voltage range of the DC-line bus 21 where the DC/AC conversion circuit 17 operates stably.

As will be detailed later, the most distinctive feature of the invention is that the rectifier-control mode and the inverter-control mode that are described above are selectively switched to each other adequately at the charging/discharging operation, thereby to allow the insulation transformer 36 to have a simple structure with a fixed turn ratio, and to make it possible to smoothly adapt to a change in either of DC voltages as the conversion targets.

Figure 11:
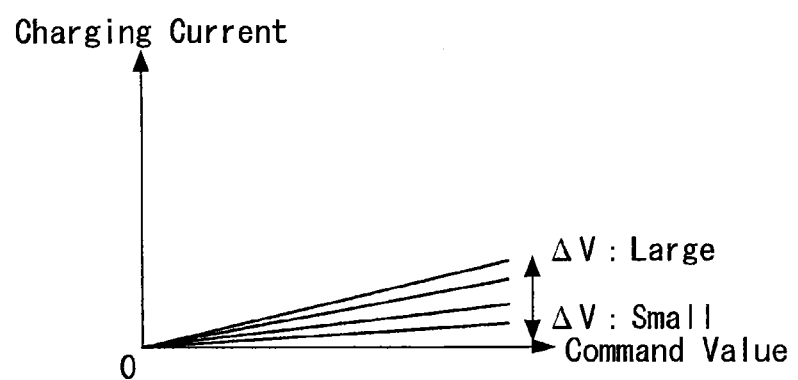
FIG. 11 is a graph showing a relationship between a control command value and a charging current at the time of charging a storage battery by a rectifier-control mode according to Embodiment 1.
Figure 12:
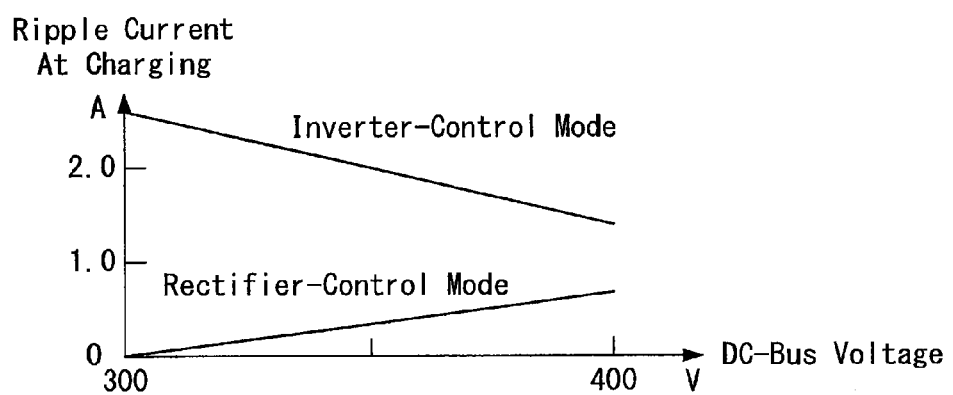
FIG. 12 is a graph showing a relationship between a DC-bus voltage and a ripple current at the time of charging the storage battery by each control mode according to Embodiment 1.

The following FIG. 10 to FIG. 12 show various characteristics to be considered when determining how to make such a selective switching.

Firstly, FIG. 10 shows a relationship between a command value (Duty ratio) and a charging current in the case of charging the storage battery 1 by the first inverter-control mode. Shown at FIG. 10(*a*) is a characteristic when the voltage of the storage battery 1 is equal to or more than the DC-bus voltage of the DC-line bus 21. Similarly, shown at FIG. 10(*b*) is a characteristic when the voltage of the storage battery 1 is less than the DC-bus voltage of the DC-line bus 21.

As shown in FIG. 10(*b*), in the first inverter-control mode, when the voltage of the storage battery 1 is less than the DC-bus voltage of the DC-line bus 21, some charging current flows even when the command value for the second power converter 42 becomes zero for making zero the output of the second power converter 42. This circuit operation is substantially the same as that of the second power converter 42 when the command value for the first power converter 41 in the first rectifier-control mode is set to 50%. That is, the output to the storage battery 1 never reaches zero.

Note that even in the case of discharging from the storage battery 1 by the second inverter-control mode, a characteristic in relationship between the command value and the discharging current is similar to in FIG. 10, although the magnitude relationship between the voltage of the storage battery 1 and the DC-bus voltage of the DC-line bus 21 is reversed because the direction of power supply is reversed.

Specifically, when the voltage of the storage battery 1 is equal to or less than the DC-bus voltage of the DC-line bus 21, the discharging current reaches 0 A when the command value becomes zero as shown in FIG. 10(*a*). In contrast, when the voltage of the storage battery 1 exceeds the DC-bus voltage of the DC-line bus 21, the relationship becomes as shown in FIG. 10(*b*), so that the discharging current never reaches zero even when the command value becomes zero.

FIG. 11 shows a relationship between a command value (Duty ratio) and a charging current in the case of charging the storage battery 1 by the first rectifier-control mode. The maximum charging current amount is determined according to a differential voltage $\Delta V$ resulting from subtracting the battery voltage of the storage battery 1 from the DC-bus voltage. Specifically, the smaller the $\Delta V$ is, the smaller the maximum charging current value becomes, and when the DC-bus voltage becomes equal to or less than the battery voltage of the storage battery 1, the charging current becomes zero.

Note that, in the case of discharging from the storage battery 1 by the second rectifier-control mode, the above relationship (characteristic) between the command value and the discharging current is unchanged, although the relationship between the command value and the discharging current is given from the differential result by another $\Delta V$-calculation method of subtracting the DC-bus voltage from the battery voltage of the storage battery 1, because the direction of power supply is reversed.

FIG. 12 shows an example of a relationship between a DC-bus voltage and a ripple current at the time of charging by each control mode. Here, description is given assuming that, in FIG. 12, the battery voltage of the storage battery 1 is 300V, the DC/AC conversion circuit 17 is connected to a power system (200V), and the DC-bus voltage is controlled between 300V to 400V.

It is based on the following reason that the ripple current at the time of charging is shown here. For example, when a lithium-ion battery is used as the storage battery 1, charging of power is carried out through a chemical reaction. Thus, when the charging current varies abruptly or a large amplitude ripple is superimposed on the charging current, the chemical reaction cannot follow the charging current, so that metal lithium is deposited to thereby deteriorate the storage battery 1. Likewise, charging at a high temperature promotes deterioration of the storage battery 1. Further, when the charging current is large, a heat generation amount at the time of charging increases, so that a cell temperature of the battery is further elevated to thereby promote deterioration of the storage battery 1.

Thus, in Embodiment 1, the first rectifier-control mode is adopted at the startup time, so that the charging current amount to the storage battery 1 is slowly elevated. Further, the first inverter-control mode is not used in an unnecessary manner, so that the ripple current interposed on the charging current is suppressed to be small. Such a control method that can suppress the load imposed on the storage battery 1 at the time of charging to be minimum, to thereby reduce deterioration of the storage battery 1 to be minimum, will be described.

By the way, as shown in FIG. 12, in the rectifier-control mode, the ripple current becomes larger as the difference becomes larger between the DC voltage in the power supply side (corresponding to the voltage of the first DC-voltage source, at the time of charging) and the DC voltage in the power reception side (corresponding to the voltage of the second DC-voltage source, at the time of charging). Meanwhile, in the inverter-control mode, the ripple current becomes smaller as the difference becomes larger between the DC voltage in the power supply side (corresponding to the voltage of the first DC-voltage source, at the time of charging) and the DC voltage in the power reception side (corresponding to the voltage of the second DC-voltage source, at the time of charging).

Accordingly, at the time of discharging, since the power supply side and the power reception side are reversed from those at the time of charging, a tendency of the ripple current is reversed from that at the time of charging. That is, in the second rectifier-control mode at the time of discharging, the ripple current becomes smaller as the DC-bus voltage becomes higher, and in the second inverter-control mode at the time of discharging, the ripple current becomes larger as the DC-bus voltage becomes higher.

Even at the time of discharging, though not to the extent at the time of charging, the storage battery 1 is deteriorated when the discharging current varies abruptly or a large amplitude ripple is superimposed on the discharging current.

Accordingly, in Embodiment 1, such a control method will also be described that can suppress the load imposed on the storage battery 1 at the time of discharging to be minimum, to thereby reduce deterioration of the storage battery 1 to be minimum.

In the followings, operations at the times of charging and discharging of the power conversion device according to Embodiment 1 of the invention will be described. Here, there is assumed that the first power converter 41 is in the primary side and the second power converter 42 is in the secondary side, so that the command value for the first power converter 41 is referred to as a primary-side command value and the command value for the second power converter 42 is referred to as a secondary-side command value.

Figure 13:
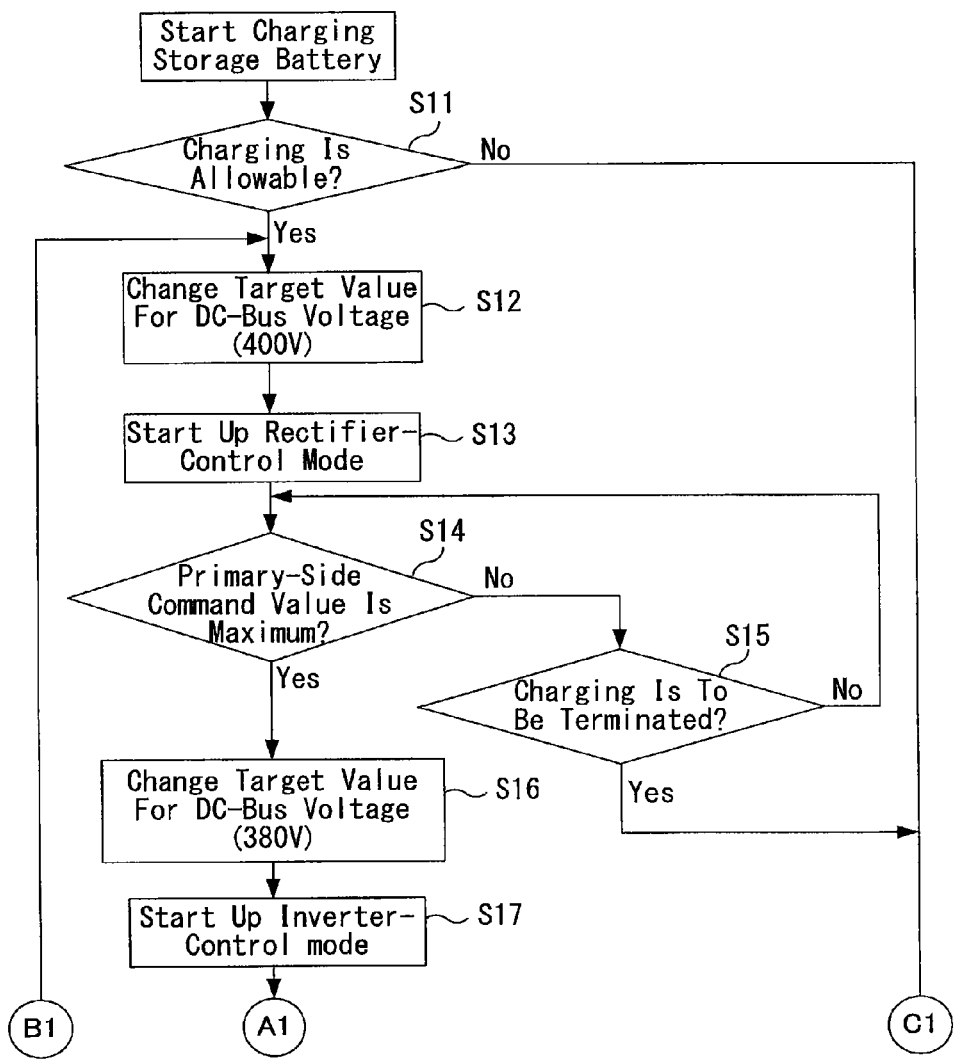
FIG. 13 is a diagram showing a control flow of the DC/DC control circuit 14 shown in FIG. 3 at the time of charging, according to Embodiment 1.
Figure 14:
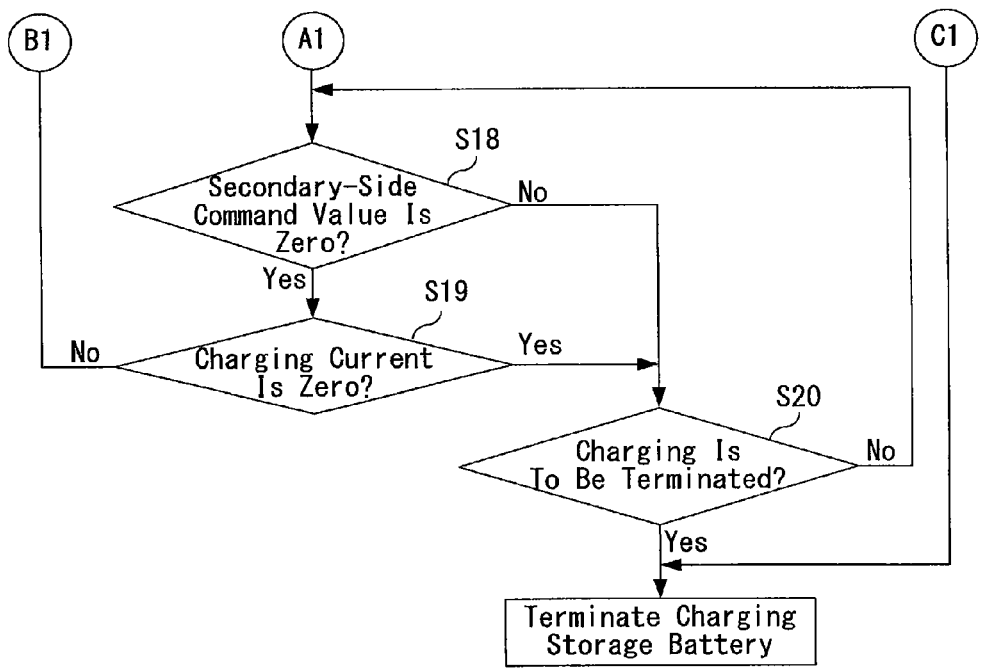
FIG. 14 is a diagram showing a control flow of the DC/DC control circuit 14 shown in FIG. 3 at the time of charging, according to Embodiment 1.

FIG. 13 and FIG. 14 are diagrams each showing a control flow of the DC/DC control circuit 14 at the time of charging.

In FIG. 1, when a notification of a request for charging the storage battery 1 is given from an unshown external power management server in a home (hereinafter, indicated as HEMS (Home Energy Management System)), the storage-battery control circuit 56 in the DC/DC control circuit 14 confirms whether charging is allowable or not for the storage battery 1 (Step S11 in FIG. 13).

Specifically, the storage-battery control circuit 56 makes a request for the storage-battery management unit 2 in the storage battery 1 to notify of the power charged amount in the storage battery 1 and the charging allowance/disallowance information. Upon receiving the request, the storage-battery management unit 2 notifies the storage-battery control circuit 56 of allowance/disallowance of charging and the power charged amount. The storage-battery control circuit 56, when received a notification of disallowance of charging ("No" in Step S11), notifies the HEMS of that reception, and waits until notified of a next command.

In contrast, in the case of allowance of charging ("Yes" in Step S11), the storage-battery control circuit 56 issues an order to the DC/AC control circuit 18 to connect with the power system 3.

In Embodiment 1, description is made about a case where the power conversion device 10 is started up according to a charging/discharging order from the external HEMS, and is suspended during normal time for power saving. Upon receiving a startup order from the storage-battery control circuit 56, the DC/AC control circuit 18 starts controlling the DC/AC conversion circuit 17 so that the DC-bus voltage becomes a predetermined value. In this case, a center voltage (350V) in the DC-bus voltage control range shown in FIG. 9 is given as an initial value that is a control target for the DC-bus voltage. The initial value is, of course, not limited to 350V. In Embodiment 1, the DC-bus voltage of the DC-line bus 21 is managed by the DC/AC conversion circuit 17.

The storage-battery control circuit 56 monitors the value of DC-bus voltage outputted from the voltmeter 15, and waits until the DC-bus voltage of the DC-line bus 21 becomes the predetermined voltage. When the DC-bus voltage becomes the predetermined voltage, the storage-battery control circuit 56 outputs a charging request to the storage-battery management unit 2 in the storage battery 1. Upon receiving the charging request from the storage-battery control circuit 56, the storage-battery management unit 2 confirms the status information of the storage battery 1 to thereby output the power storage amount, the upper and lower limit voltages of the storage battery 1, the temperature information of the storage battery 1, the maximum charging-current information, the maximum power storage amount, and the voltage of the storage battery.

Upon receiving the status information of the storage battery 1 from the storage-battery management unit 2, the storage-battery control circuit 56 confirms the power storage amount of the storage battery 1. Note that if the power storage amount exceeds 90% of the maximum power storage amount, the storage-battery control circuit 56 determines that it is fully charged, thereby to give a notice of disallowance of charging to the HEMS as well as to output a suspending request to the DC/AC control circuit 18, and waits until receiving a next command. In contrast, if the power storage amount is less than 90%, charging is performed until the power storage amount exceeds 95%.

After completion of confirming the power storage amount of the storage battery 1, the storage-battery control circuit 56 issues an order to the DC/AC control circuit 18 to change the control target value for the DC-bus voltage of the DC-line bus 21 to 400V that is the upper limit value in the DC-bus voltage control range (Step S12), because of the reason described later. Upon notified of the new control target value for the DC-bus voltage, the DC/AC control circuit 18 changes the control target value and outputs a control signal to the DC/AC conversion circuit 17. After completion of changing the control target value for the DC-bus voltage in Step S12, the storage-battery control circuit 56 starts up the DC/DC conversion circuit 13 with the first rectifier-control mode (Step S13).

Specifically, the storage-battery control circuit 56 outputs a startup order to the charging rectifier-mode control circuit 52, and issues an order to the switching circuit 55 to output the control signals Ga to Gd outputted from the charging rectifier-mode control circuit 52. Note that the charging rectifier-mode control circuit 52 is started up with a predetermined initial value.

When the DC/DC conversion circuit 13 is started up with the first rectifier-control mode, the storage-battery control circuit 56 monitors the command values C,D that are the primary-side command values outputted from the charging rectifier-mode control circuit 52. Then, it confirms whether or not the command values C,D for the control signals Gc,Gd to be outputted to the first power converter 41 become maximum, by comparing them with the upper limit values of the command values C,D or with setup values (maximum values) having been set based on the upper limit values in consideration of detection error etc. Note that the setup values are given as the first setup values (Step S14). In this Step S14, what is determined is whether the output to the storage battery 1 (charging current) reaches an upper limit value that can be outputted in the first rectifier-control mode based on the charging rectifier-mode control circuit 52, so that any more output cannot be acquired.

When the command values C,D are less than the setup values (maximum values) ("No" in Step S14), it is determined whether an order requesting to suspend charging is issued or not from the unshown HEMS, an order to suspend charging is issued or not from the storage-battery management unit 2, and the power charged amount exceeds 95% or not (Step S15). Note that even when the order value for the charging current is 0 A, it is determined as an order to suspend charging. When the order to suspend charging is not issued or the power charged amount is less than 95% ("No" in Step S15), the flow returns to Step S14, so that the command values are continued to be monitored.

In contrast, when the order requesting to suspend charging or the order to suspend charging has been notified, or the power charged amount is 95% or more ("Yes" in Step S15), the charging control is terminated as follows. That is, the storage-battery control circuit 56 issues an order to the DC/AC control circuit 18 to change the control target value for the DC-bus voltage of the DC-line bus 21 to the original voltage of 350V, and suspends the charging control in the DC/DC conversion circuit 13. Then, after the DC-bus voltage of the DC-line bus 21 is converged to 350V, the storage-battery control circuit 56 notifies the HEMS of the suspension of charging, and waits for a next operation order. If no order is issued from the HEMS even waiting for a predetermined time, the DC/AC conversion circuit 17 is suspended.

Meanwhile, when the command values C,D outputted from the charging rectifier-mode control circuit 52 are equal to or more than the setup values (maximum values), that is, when the output (charging current) to the storage battery 1 becomes equal to or more than the above-described first upper limit value ("Yes" in Step S14), anymore charging current cannot be outputted by the first rectifier-control mode from the DC/DC conversion circuit 13. Then, the storage-battery control circuit 56 issues an order to the DC/AC control circuit 18 to decrease the control target value for the DC-bus voltage of the DC-line bus 21 by a predetermined value from 400V to 380V, because of the reason described later (Step S16).

Upon notified of the new control target value for the DC-bus voltage, the DC/AC control circuit 18 changes the control target value and outputs a control signal to the DC/AC conversion circuit 17. After completion of changing the control target value for the DC-bus voltage in Step S16, the storage-battery control circuit 56 starts up the DC/DC conversion circuit 13 with the first inverter-control mode (Step S17). Specifically, the storage-battery control circuit 56 issues a suspension order to the charging rectifier-mode control circuit 52, and outputs a startup order to the charging inverter-mode control circuit 51. Note that, upon receiving the suspension order, the charging rectifier-mode control circuit 52 suspends while retaining various registers and variable values. In contrast, the charging inverter-mode control circuit 51 starts controlling with a predetermined initial value.

Figure 15:
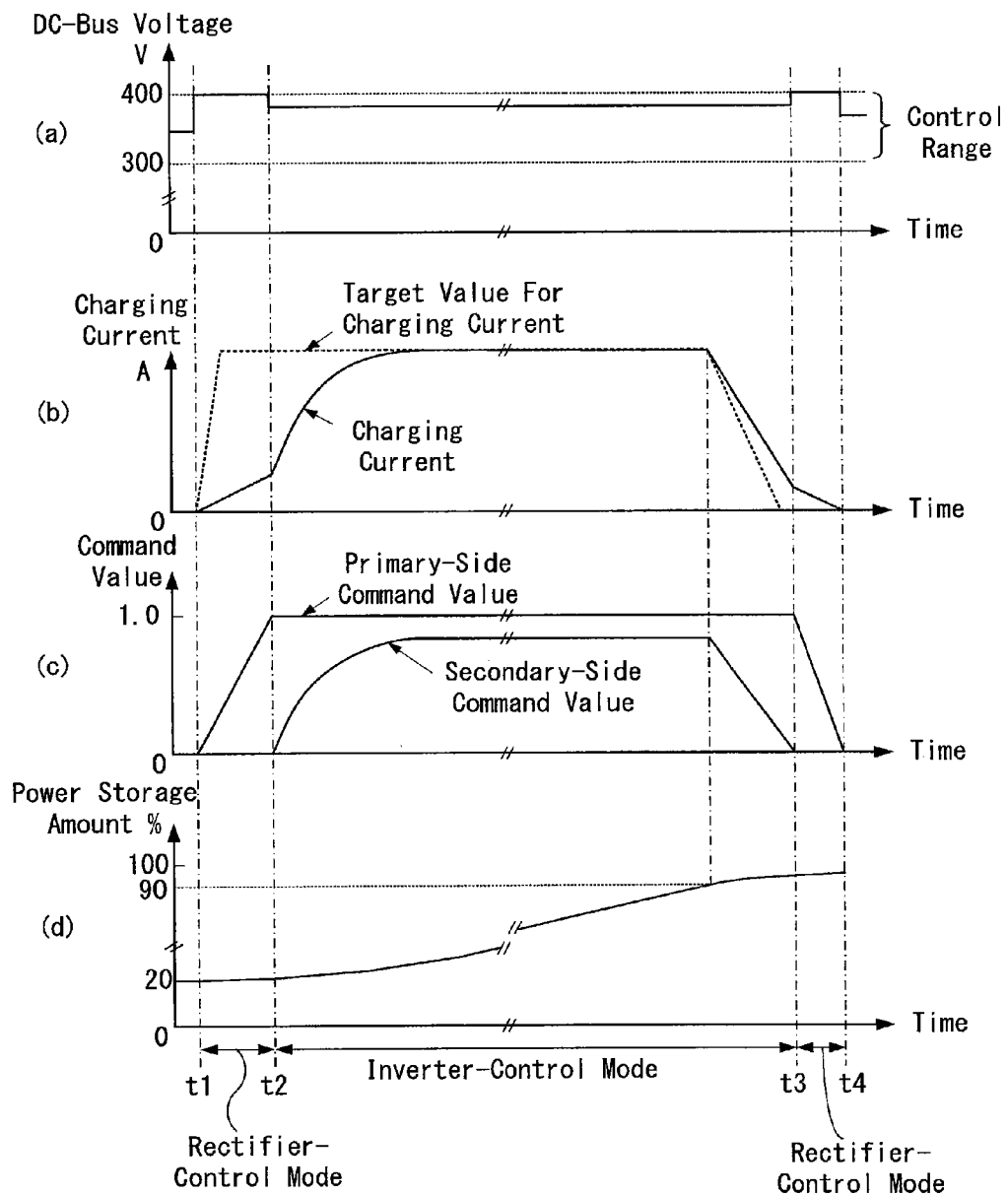
FIG. 15 is timing charts each for illustrating an operation of the DC/DC control circuit 14 shown in FIG. 3 at the time of charging, according to Embodiment 1.

The above operation of the DC/DC conversion circuit 13 from the start of charging up to Step S17, will be described in more detail using FIG. 15. Note that FIG. 15 shows the operation when the DC-bus voltage is higher than the battery voltage of the storage battery 1.

Shown at FIG. 15(a) is a waveform of the control target value for the DC-bus voltage. In this figure, the abscissa represents time, and the ordinate represents a voltage value. Shown at FIG. 15(b) are a target value for the charging current outputted from the storage-battery management unit 2 and a variation in the charging current outputted from the second power converter 42 to the storage battery 1. In this figure, the abscissa represents time, and the ordinate represents a current value. Shown at FIG. 15(c) are waveforms of the command values (Duty ratios) generated in the charging inverter-mode control circuit 51 and the charging rectifier-mode control circuit 52 in the DC/DC control circuit 14. In this figure, the abscissa represents time, and the ordinate represents a numerical value of the command value generated for controlling the first power converter 41 and the second power converter 42. Shown at FIG. 15(d) is a variation in the power storage amount of the storage battery 1. In this figure, the abscissa represents time, and the ordinate represents a storage amount (%) of power stored in the storage battery 1 by charging.

Upon inputting an order to start charging from the HEMS and receiving allowance of charging from the storage-battery management unit 2, the DC/AC conversion circuit 17, as previously described, connects with the power system 3. Then, when the DC-bus voltage of the DC-line bus 21 becomes 350V after the connection with the power system 3, the storage-battery control circuit 56 starts the charging to the storage battery 1. When the charging is started to the storage battery 1, the DC/AC conversion circuit 17 performs controlling after changing the control target value for the DC-bus voltage of the DC-line bus 21 to 400V that is the upper limit value of the voltage range thereof (see, time t1 in FIG. 15(a)).

Meanwhile, the storage-battery control circuit 56 issues a startup order to the charging rectifier-mode control circuit 52 and issues an order to the switching circuit 55 to select the output of the charging rectifier-mode control circuit 52. Upon receiving the startup order, the charging rectifier-mode control circuit 52 starts controlling of the charging current on the basis of the target value for the charging current (a broken line in FIG. 15(b)) outputted from the storage-battery management unit 2. In a period from time t1 to t2, the charging rectifier-mode control circuit 52 generates the command values C,D (primary-side command values) for controlling the first power converter 41 to thereby output the control signals Gc,Gd, so that the DC/DC conversion circuit 13 is controlled by the first rectifier-control mode.

In Embodiment 1, since the DC/DC conversion circuit 13 is to be started up with the first rectifier-control mode, the DC-bus voltage of the DC-line bus 21 is elevated to 400V (upper limit voltage of the system). This is from the following reason. In the rectifier-control mode, an AC voltage (AC power) is generated in the power supply side, and, in the power reception side, the AC voltage (AC power) inputted from the power supply side is diode-rectified to be converted to a DC voltage (DC power). Therefore, as shown in FIG. 11, the larger the difference between the DC-bus voltage and the battery voltage of the storage battery 1, the more the current amount (power amount) can be gained. Meanwhile, as shown in FIG. 12, although the ripple in the charging current increases as the DC-bus voltage becomes higher, it is smaller in the rectifier-control mode than in the inverter-control mode, so that deterioration caused by charging on the storage battery 1 can be reduced to be small. Accordingly, there is an effect that, by elevating the DC-bus voltage to 400V, the charging current range capable of being managed in the first rectifier-control mode can be enlarged so that the applicable chance of the first inverter-control mode is reduced, to thereby achieve reduction of deterioration caused by charging on the storage battery 1.

Of course, such an effect is particularly effective, in particular, in the case where the power charged amount of the storage battery 1 is small so that the battery voltage is low, or in the case where it is unnecessary to largely get the charging current because the charging time can be sufficiently ensured, such as at the time of charging using midnight power. Further, in Embodiment 1, although the DC-bus voltage of the DC-line bus 21 is set to the upper limit voltage in the control range, the DC-bus voltage is not limited thereto, and a similar effect is, of course, accomplished even when the DC-bus voltage is set to a predetermined voltage near the upper limit voltage in consideration, for example, of a normal deviation at the time of controlling.

In the first rectifier-control mode, as described previously, it is unable to sufficiently acquire the charging current as compared to the first inverter-control mode. Accordingly, as shown in FIG. 15(*c*), the command value for controlling the first power converter 41 reaches the setup value (maximum value) before the charging current reaches the charging current target value (time t2, in FIG. 15), so that any more charging current cannot be acquired in the first rectifier-control mode. The storage-battery control circuit 56 monitors the command value from the charging rectifier-mode control circuit 52 and, when confirms that the value reaches the upper limit value (maximum value), determines that any more charging current cannot be acquired in the first rectifier-control mode ("Yes" in Step S14 in FIG. 13) to thereby switch the control mode to the first inverter-control mode.

Specifically, the storage-battery control circuit 56 issues: an order to change the control target value for the DC-bus voltage of the DC-line bus 21 (400→380V) to the DC/AC control circuit 18; a suspension order to the charging rectifier-mode control circuit 52; a startup order to the charging inverter-mode control circuit 51; and an order to select the output of the charging inverter-mode control circuit 51, to the switching circuit 55.

Upon receiving the suspension order, the charging rectifier-mode control circuit 52 suspends while retaining various registers, control variables and the like. Further, the charging inverter-mode control circuit 51 starts controlling with an initial value (see, Inverter-Control Mode in FIG. 15(*c*)). As described previously, by switching the control mode, a current range (power range) that could not be managed by the first rectifier-control mode, can be managed by the first inverter-control mode. Thus, by adopting this control method, there is provided an effect that it is possible to cover a range up to a higher charging current (charging power), and as described previously, when the charging current (charging power) is small, it is possible to suppress ripple in the charging current to be small to thereby reduce deterioration caused on the storage battery 1.

Meanwhile, the circuit operation of the DC/DC conversion circuit 13 when a maximum current (maximum power) is supplied to the storage battery 1 in the first rectifier-control mode, is the same as the operation when power is supplied to the storage battery 1 in the first inverter-control mode with the command value "0". Thus, at the time the control is switched, it is unnecessary to temporarily suspend the operations of the first power converter 41 and the second power converter 42, thus providing an effect that the control method can be switched seamlessly and smoothly.

Meanwhile, in Embodiment 1, at the time the DC/DC conversion circuit 13 is switched to the first inverter-control mode, the control target value for the DC-bus voltage of the DC-line bus 21 is dropped from 400V to 380V. This is from the following reason. For example, when the target value for the charging current is almost the same as the value of charging current capable of being supplied by the first rectifier-control mode, if the control mode is switched without changing the DC-bus voltage value, a hunting of the control mode occurs that is specifically an unstable state of the control mode where the first rectifier-control mode and the first inverter-control mode are switched alternately.

Thus, in Embodiment 1, at the time of control-mode switching, the DC-bus voltage is dropped by a predetermined value (here, 20V) from the value before the switching, to thereby reduce the maximum value of the current (power) capable of being supplied by the first rectifier-control mode, so that it becomes possible to have a hysteresis at the time of control-mode switching. This prevents the hunting at the time of control-mode switching, providing an effect that the charging control can be performed stably.

Note that in Embodiment 1, although the control target value for the DC-bus voltage at the time of control-mode switching is set to 380V, it is not limited thereto. A similar effect is accomplished, of course, when taking a value that is lowered by a predetermined value from the control target value for the DC-bus voltage in the first rectifier-control mode before the switching. Further, in the first inverter-control mode, generally, the ripple amount of the charging current increases as the DC-bus voltage is dropped, as shown in FIG. 12. Therefore, when the control target value for the DC-bus voltage is to be determined, it is needless to say that the DC-bus voltage is desirably set to a maximum voltage in a range where the above hunting can be prevented.

As shown in FIG. 15(*d*), the power storage amount in the storage battery 1 increases gradually by the above charging operation. The description of the subsequent operation will be followed also with reference to FIG. 14.

When the power storage amount of the storage battery 1 becomes a predetermined value (for example, 90%) or more, the storage-battery management unit 2 gradually lowers the charging current target value as shown in FIG. 15(*b*) in order to suspend the charging to the storage battery 1. The charging inverter-mode control circuit 51, as shown in the figure, gradually lowers the command value to thereby narrow down the charging current. The storage-battery control circuit 56 monitors command-value information in the charging inverter-mode control circuit 51. Then, it confirms whether or not the command value for the second power converter 42, that is the secondary-side command value, becomes "0" (Step S18 in FIG. 14).

When confirmed at the time t3 in FIG. 15 that the command value for the second power converter 42 is "0" ("Yes" in Step S18), the storage-battery control circuit 56 confirms using the ammeter 12 whether or not the current toward the storage battery 1 has become "0" (Step S19 in FIG. 14).

As described previously with FIG. 10(*b*), when the DC-bus voltage is higher than the battery voltage of the storage battery 1, it is unable to narrow down the charging current to "0" even if the command value in the charging inverter-mode control circuit 51 becomes "0". Therefore, in Embodiment 1, when the charging current is flowing even if the command value for the second power converter 42 in the charging inverter-mode control circuit 51 becomes "0" ("No" in Step S19), the flow returns to Step S12, so that the control mode is switched to the first rectifier-control mode again to thereby continue controlling (see, Rectifier-Control Mode in FIG. 15).

Note that, according to the relationship between the DC-bus voltage and the battery voltage of the storage battery 1 at that time, if the charging current is "0" ("Yes" in Step S19), the flow proceeds to Step S20, and then when it is determined that the charging is to be terminated because no particular command for continuing charging is issued ("Yes" in Step 20), the storage-battery charging control is terminated. In this case, the charging control is terminated with the first inverter-control mode without returning to the first rectifier-control mode again.

The storage-battery control circuit 56, when determined a transition to the first rectifier-control mode, issues an order to the DC/AC control circuit 18 to change the control target for the DC-bus voltage of the DC-line bus 21 to the original 400V (Step S12 in FIG. 13), and also starts up the charging rectifier-mode control circuit 52. At that time, it issues an order to the switching circuit 55 to output the control signal outputted from the charging rectifier-mode control circuit 52. When the startup order is issued, the charging rectifier-mode control circuit 52 starts controlling with the register values and the variable values retained at the previous termination of control, as initial values (time t3 in FIG. 15).

When the charging control in the first rectifier-control mode is started, the storage-battery control circuit 56 monitors the command value in the charging rectifier-mode control circuit 52 and the charging current, and determines, when the command value and the charging current become "0", that the charging is terminated ("Yes" in Step S15 in FIG. 13), thereby to initialize the register and the variable related to the charging control in the DC/DC control circuit 14 and to suspend the power conversion device after notifying the HEMS of the completion of the charging.

Note that when the command value for the charging current or the like changes after the transition to the first rectifier-control mode so that the command value outputted from the charging rectifier-mode control circuit 52 becomes the setup value (maximum value) ("Yes" in Step S14 in FIG. 13), the flow moves to the first inverter-control mode again (Steps S16, S17).

As described above, at the time of charging the storage battery 1, the power conversion device of Embodiment 1 starts up the DC/DC conversion circuit 13 with its control mode being the first rectifier-control mode. Then, when the target charging current (power) cannot be obtained in the first rectifier-control mode, the control mode is switched to the first inverter-control mode.

Thus, when the target charging current (power) is small, by charging with the first rectifier-control mode, there is an effect that the ripple in the charging current can be suppressed to be small, to thereby reduce deterioration caused on the storage battery 1 to be minimum.

Further, when the target charging current (power) cannot be obtained, because said control mode is switched to the first inverter-control mode where the charging current can be sufficiently acquired, there is an effect that it is possible to deal with the case where rapid charging is required.

Meanwhile, in a system provided with a solar battery that can cooperate with the power system 3 and at the time of power blackout of the power system 3, when the power conversion device of Embodiment 1 performs a cooperative operation with the solar battery so as to supply power to an in-house load, there is provided the following effect. Even when a large amount of surplus power appears in the power generated by the solar battery because of rapid change in the amount of solar radiation, and all of the surplus power cannot be charged to the storage battery 1 in the first rectifier-control mode, it is possible by seamlessly switching to the first inverter-control mode, to charge the surplus power to the storage battery 1. Thus, the power generation amount of the solar battery can be fully utilized.

Note that in Embodiment 1, although the initial values of the charging inverter-mode control circuit 51 and the charging rectifier-mode control circuit 52 are not yet mentioned, they will be described below.

Generally, in the case of controlling a power converter, in order to prevent arm short-circuit from occurring due to difference in delay amount of the control signal, difference in switching speed (element's responsivity) or the like, a dead time is provided in the control signal for driving each switching device. Thus, at the time of switching from the first rectifier-control mode to the first inverter control mode, in a period where the command value cannot acquire a pulse width equal to or more than the time defined by the dead time, the control signal supplied to the switching device becomes "0". Accordingly, at the time the control is switched, there emerges a time period where the charging current amount (power amount) does not vary.

In particular, in Embodiment 1, the control target value for the DC-bus voltage of the DC-line bus 21 is switched at the time of control-mode switching, and thus, in the case of switching, for example, from the first rectifier-control mode to the first inverter-control mode, the charging current becomes smaller in the period of the dead time because the DC-bus voltage is dropped.

Thus, according to Embodiment 1, it is configured so that the initial values of the respective registers and the variables that are used for controlling the charging inverter-mode control circuit 51 and the charging rectifier-mode control circuit 52, are set as initial values in consideration of the dead time (values each including an offset corresponding to the dead time). This provides an effect that, at the time of control-mode switching, it is possible to make shorter or to completely negate a time period due to the dead time where the charging current amount does not vary, so that the control-mode switching can be performed successively.

Meanwhile, each of the switching devices 31a to 31d and 32a to 32d has a time until it is switched on (turn-on time), and a time until it is switched off (turn-off time). It is configured so that the initial values of the respective registers and the variables that are used for controlling the charging inverter-mode control circuit 51 and the charging rectifier-mode control circuit 52, are given in consideration of these turn-on time and turn-off time. This provides an effect that, at the time of control-mode switching, it is possible to make shorter or to completely negate a time period due to the turn-on time or turn-off time where the charging current amount does not vary, so that the control-mode switching can be performed successively.

Moreover, because the control target value for the DC-bus voltage of the DC-line bus 21 is switched at the time of control-mode switching, there is an effect that the hunting that occurs at the time of control-mode switching is suppressed. Meanwhile, when the DC-bus voltage is higher than the battery voltage of the storage battery 1 in the inverter-control mode, it is unable to narrow down the charging current to "0" even if the command value in the charging inverter-mode control circuit 51 is set to "0"; in this case, however, the control mode is switched to the first rectifier-control mode again, thus causing an effect that the charging current can be finally brought to "0".

Further, in Embodiment 1, at the time of switching from the first inverter-control mode to the first rectifier-control mode, although the charging current that is an output to the storage battery 1 is determined according to the output of the ammeter 12, this is not limitative. For example, it may be determined, of course, from the DC-bus voltage of the DC-line bus 21 and the battery voltage of the storage battery 1. Further, since the ammeter 12, etc., is generally provided with an error, the charging current value etc., to be determined may be, of course, a value in which errors of the ammeter or like sensors are predictively incorporated. Furthermore, the determination whether to switch the control mode may be made, of course, according to the charging current, the DC-bus voltage of the DC-line bus 21 and the battery voltage of the storage battery 1, in combination.

Figure 16:
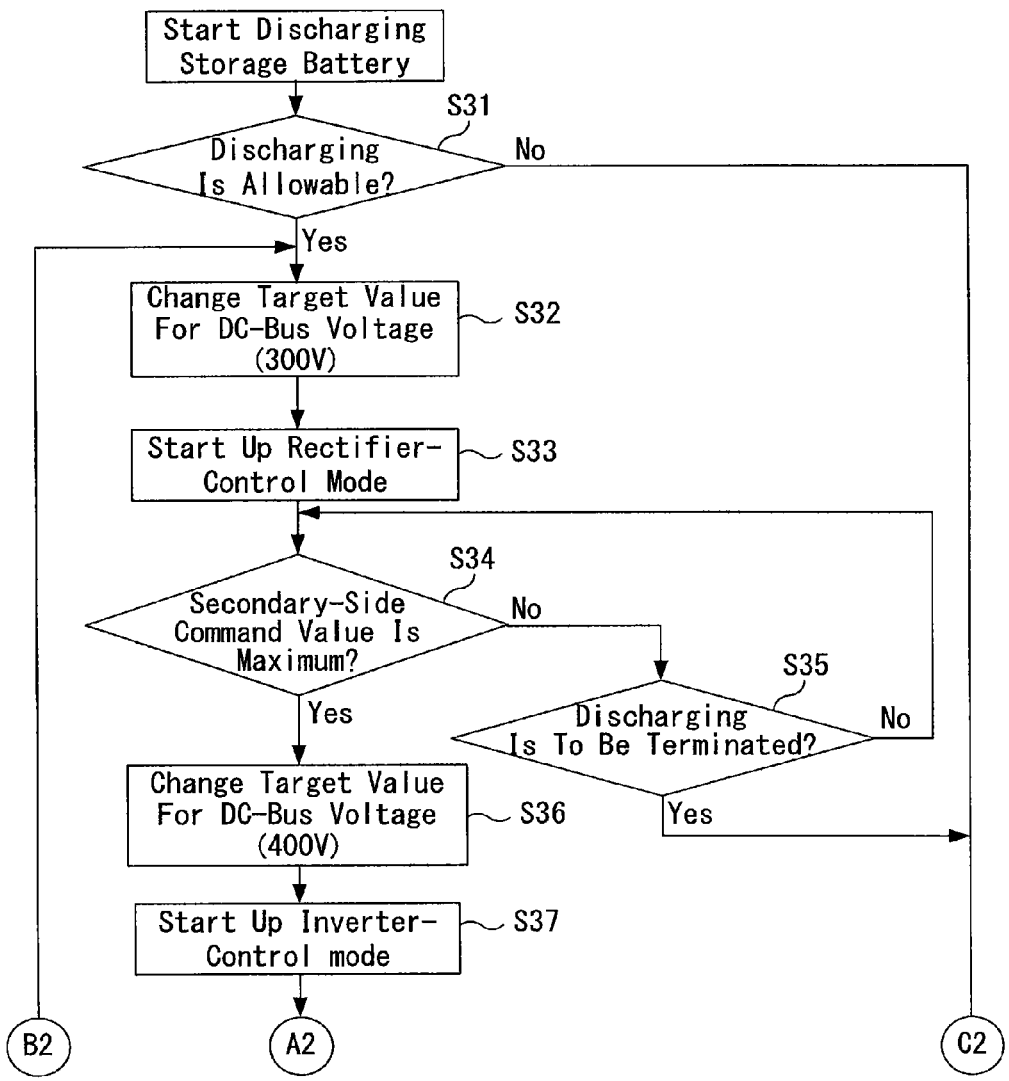
FIG. 16 is a diagram showing a control flow of the DC/DC control circuit 14 shown in FIG. 3 at the time of discharging, according to Embodiment 1.
Figure 17:
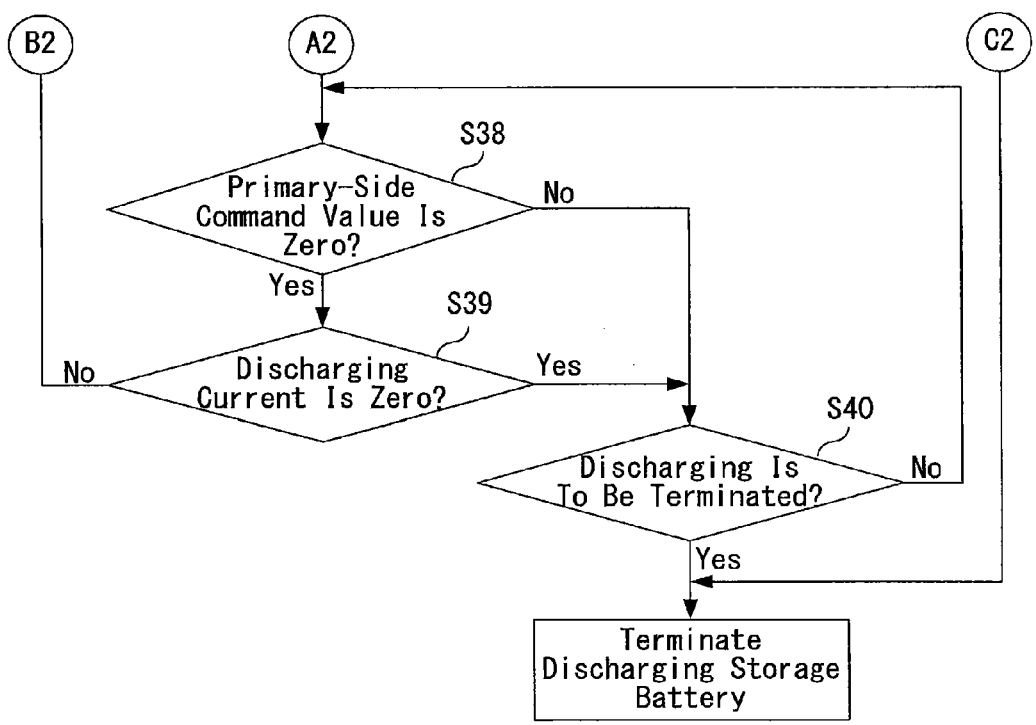
FIG. 17 is a diagram showing a control flow of the DC/DC control circuit 14 shown in FIG. 3 at the time of discharging, according to Embodiment 1.

Next, an operation at the time of discharging of the power conversion device will be described. FIG. 16 and FIG. 17 are diagrams each showing a control flow of the DC/DC control circuit 14 at the time of discharging.

In FIG. 1, when a notification of a request for discharging the storage battery 1 is given from the unshown external HEMS, the storage-battery control circuit 56 in the DC/DC control circuit 14 confirms whether discharging is allowable or not for the storage battery 1 (Step S31 in FIG. 16).

Specifically, the storage-battery control circuit 56 makes a request for the storage-battery management unit 2 in the storage battery 1 to notify of the power charged amount in the storage battery 1 and the discharging allowance/disallowance information. Upon receiving the request, the storage-battery management unit 2 notifies the storage-battery control circuit 56 of allowance/disallowance of discharging and the power charged amount. The storage-battery control circuit 56, when received a notification of disallowance of discharging ("No" in Step S31), notifies the HEMS of the disallowance of discharging and the power storage amount of the storage battery 1, and waits until notified of a next command.

In contrast, in the case of allowance of discharging ("Yes" in Step S31), the storage-battery control circuit 56 issues an order to the DC/AC control circuit 18 to connect with the power system 3.

In Embodiment 1, as has been also described for the time of charging, description is made assuming that the power conversion device 10 is started up according to a charging/discharging order from the external HEMS, and is suspended during normal time for power saving. Upon receiving a startup order from the storage-battery control circuit 56, the DC/AC control circuit 18 starts controlling the DC/AC conversion circuit 17 so that the DC-bus voltage becomes a predetermined value. In this case, the center voltage (350V) in the DC-bus voltage control range shown in FIG. 9 is given as an initial value that is a control target for the DC-bus voltage. In Embodiment 1, the DC-bus voltage of the DC-line bus 21 is managed by the DC/AC conversion circuit 17.

The storage-battery control circuit 56, similarly at the time of charging, monitors the value of DC-bus voltage outputted from the voltmeter 15, and waits until the DC-bus voltage of the DC-line bus 21 becomes the predetermined voltage. When the DC-bus voltage becomes the predetermined voltage, the storage-battery control circuit 56 outputs a discharging request to the storage-battery management unit 2 in the storage battery 1. Upon receiving the discharging request from the storage-battery control circuit 56, the storage-battery management unit 2 confirms the status information of the storage battery 1 to thereby output the power storage amount, the upper and lower limit voltages of the storage battery 1, the temperature information of the storage battery 1, the maximum discharging-current information, the maximum power storage amount, and the voltage of the storage battery.

Upon receiving the status information of the storage battery 1 from the storage-battery management unit 2, the storage-battery control circuit 56 confirms the power storage amount of the storage battery 1. Note that if the power storage amount is less than 20% of the minimum power storage amount, the storage-battery control circuit 56 determines that the power storage amount is insufficient thereby to give a notice of disallowance of discharging to the HEMS as well as to output a suspending request to the DC/AC control circuit 18, and waits until receiving a next command. In contrast, if the power storage amount is 20% or more, discharging is performed until the power storage amount becomes less than 20%.

After completion of confirming the power storage amount of the storage battery 1, the storage-battery control circuit 56 issues an order to the DC/AC control circuit 18 to change the control target value for the DC-bus voltage of the DC-line bus 21 to 300V that is the lower limit value in the DC-bus voltage control range (Step S32), because of the reason described later. Upon notified of the new control target value for the DC-bus voltage, the DC/AC control circuit 18 changes the control target value and outputs a control signal to the DC/AC conversion circuit 17. After completion of changing the control target value for the DC-bus voltage in Step S32, the storage-battery control circuit 56 starts up the DC/DC conversion circuit 13 with the second rectifier-control mode (Step S33).

Specifically, the storage-battery control circuit 56 outputs a startup order to the discharging rectifier-mode control circuit 54, and issues an order to the switching circuit 55 to output the control signals Ga to Gd outputted from the discharging rectifier-mode control circuit 54. Note that the discharging rectifier-mode control circuit 54 is started up with a predetermined initial value.

Further, in Embodiment 1, the discharging current amount (or the amount of discharging power) is notified from the external HEMS to the discharging rectifier-mode control circuit 54 through the storage-battery control circuit 56. The discharging rectifier-mode control circuit 54 controls the amount of discharging power from the storage battery 1, using the thus-notified discharging current amount (or the amount of discharging power) as a target value.

When the DC/DC conversion circuit 13 is started up with the second rectifier-control mode, the storage-battery control circuit 56 monitors the command values A,B that are the secondary-side command values outputted from the discharging rectifier-mode control circuit 54. Then, it confirms whether or not the command values A,B for the control signals Ga,Gb to be outputted to the second power converter 42 become maximum, by comparing them with the upper limit values of the command values A,B or with setup values (maximum values) having been set based on the upper limit values in consideration of detection error etc. Note that the setup values are given as the second setup values (Step S34). In this Step S34, what is determined is whether the output from the storage battery 1 (discharging current) reaches an upper limit value that can be outputted in the second rectifier-control mode based on the discharging rectifier-mode control circuit 54, so that any more output cannot be acquired.

When the command values A,B are less than the setup values (maximum values) ("No" in Step S34), it is determined whether an order requesting to suspend discharging is issued or not from the unshown HEMS, an order to suspend discharging is issued or not from the storage-battery management unit 2, and the residual power storage amount of the storage battery 1 is less than 20% or not (Step S35). When the order to suspend discharging is not issued or the power charged amount is 20% or more ("No" in Step S35), the flow returns to Step S34, so that the command values are continued to be monitored.

In contrast, when the order to terminate discharging has been notified, or the power amount to be discharged is less than 20% ("Yes" in Step S35), the discharge control is terminated as follows. That is, the storage-battery control circuit 56 issues an order to the DC/AC control circuit 18 to change the control target value for the DC-bus voltage of the DC-line bus 21 to the original voltage of 350V, and suspends the discharging control in the DC/DC conversion circuit 13. Then, after the DC-bus voltage of the DC-line bus 21 is converged to 350V, the storage-battery control circuit 56 notifies the HEMS of the suspension of discharging, and waits for a next operation order. If no order is issued from the HEMS even waiting for a predetermined time, the DC/AC conversion circuit 17 is suspended.

Meanwhile, when the command values A,B outputted from the discharging rectifier-mode control circuit 54 are equal to or more than the setup values (maximum values), that is, when the output (discharging current) from the storage battery 1 becomes equal to or more than the above-described second upper limit value ("Yes" in Step S34), any more discharging current (discharging power) cannot be outputted by the second rectifier-control mode from the DC/DC conversion circuit 13. Then, the storage-battery control circuit 56 issues an order to the DC/AC control circuit 18 to increase the control target value for the DC-bus voltage of the DC-line bus 21 by a predetermined value from 300V to be changed to 400V, because of the reason described later (Step S36).

Upon notified of the new control target value for the DC-bus voltage, the DC/AC control circuit 18 changes the control target value and outputs a control signal to the DC/AC conversion circuit 17. After completion of changing the control target value for the DC-bus voltage in Step S36, the storage-battery control circuit 56 starts up the DC/DC conversion circuit 13 with the second inverter-control mode (Step S37). Specifically, the storage-battery control circuit 56 issues a suspension order to the discharging rectifier-mode control circuit 54, and outputs a startup order to the discharging inverter-mode control circuit 53. Note that, upon receiving the suspension order, the discharging rectifier-mode control circuit 54 suspends while retaining various registers and variable values. In contrast, the discharging inverter-mode control circuit 53 starts controlling with a predetermined initial value.

The above operation of the DC/DC conversion circuit 13 from the start of discharging up to Step S37, will be described in more detail using FIG. 18. Note that, FIG. 18 shows the operation when the battery voltage of the storage battery 1 is higher than the DC-bus voltage.

Shown at FIG. 18 (a) is a waveform of the control target value for the DC-bus voltage. In this figure, the abscissa represents time, and the ordinate represents a voltage value. Shown at FIG. 18(b) are a target value for the discharging current outputted from the HEMS and a waveform of the discharging current outputted from the first power converter 41. In this figure, the abscissa represents time, and the ordinate represents a current value. Shown at FIG. 18(c) are waveforms of the command values (Duty ratios) generated in the discharging inverter-mode control circuit 53 and the discharging rectifier-mode control circuit 54 in the DC/DC control circuit 14. In this figure, the abscissa represents time, and the ordinate represents a numerical value of the command value generated for controlling the first power converter 41 and the second power converter 42. Shown at FIG. 18(d) is a variation in the power storage amount of the storage battery 1. In this figure, the abscissa represents time, and the ordinate represents a power storage amount (%) that varies by discharging.

Upon inputting an order to start discharging from the HEMS and receiving allowance of discharging from the storage-battery management unit 2, the DC/AC conversion circuit 17, as previously described, connects with the power system 3. Then, when the DC-bus voltage of the DC-line bus 21 becomes 350V after connection with the power system 3, the storage-battery control circuit 56 starts the discharging from the storage battery 1. When the discharging is started from the storage battery 1, the DC/AC conversion circuit 17 performs controlling after changing the control target value for the DC-bus voltage of the DC-line bus 21 to 300V that is the lower limit value of the voltage range thereof (see, time t1 in FIG. 18(a)).

Meanwhile, the storage-battery control circuit 56 issues a startup order to the discharging rectifier-mode control circuit 54 and issues an order to the switching circuit 55 to select the output of the discharging rectifier-mode control circuit 54. Upon receiving the startup order, the discharging rectifier-mode control circuit 54 starts controlling of the discharging current on the basis of the target value for the discharging current (a broken line in FIG. 18(b)) outputted from the HEMS. In a period from time t1 to t2, the discharging rectifier-mode control circuit 54 generates the command values A,B (secondary-side command values) for controlling the second power converter 42 to thereby output the control signals Ga,Gb, so that the DC/DC conversion circuit 13 is controlled by the second rectifier-control mode.

In Embodiment 1, since the DC/DC conversion circuit 13 is to be started up with the second rectifier-control mode, the DC-bus voltage of the DC-line bus 21 is dropped to 300V (lower limit voltage of the system). This is from the following reason. In the rectifier-control mode, an AC voltage (AC power) is generated in the power supply side, and, in the power reception side, the AC voltage (AC power) inputted from the power supply side is diode-rectified to be converted to a DC voltage (DC power). Therefore, as shown in FIG. 11, the larger the difference between the battery voltage of the storage battery 1 and the DC-bus voltage, the more the current amount (power amount) can be gained. Meanwhile, as shown in FIG. 12, unlike at the time of charging, the ripple in the discharging current increases as the DC-bus voltage becomes lower; however, it is smaller in the rectifier-control mode than in the inverter-control mode, so that deterioration caused by discharging on the storage battery 1 can be reduced to be small. Accordingly, there is an effect that, by dropping the DC-bus voltage to 300V, the discharging current range capable of being managed in the second rectifier-control mode can be enlarged so that the applicable chance of the second inverter-control mode is reduced, to thereby achieve reduction of deterioration caused by discharging on the storage battery 1.

Of course, such an effect is particularly effective, in particular, in the case where the discharging power amount of the storage battery 1 is small and thus the battery voltage is high. Further, in Embodiment 1, although the DC-bus voltage of the DC-line bus 21 is set to a lower limit voltage in the control range, the DC-bus voltage is not limited thereto, and a similar effect is, of course, accomplished even when the DC-bus voltage is set to a predetermined voltage near the lower limit voltage in consideration, for example, of a normal deviation at the time of controlling.

In the second rectifier-control mode, as described previously, it is unable to sufficiently acquire the discharging current as compared to the second inverter-control mode. Accordingly, as shown at FIG. 18(c), the command value for controlling the second power converter 42 reaches the setup value (maximum value) before the discharging current reaches the discharging current target value (time t2, in FIG. 18), so that anymore discharging current cannot be acquired in the second rectifier-control mode. The storage-battery control circuit 56 monitors the command value of the discharging rectifier-mode control circuit 54 and, when confirms that the value reaches the upper limit value (maximum value), determines that any more discharging current cannot be acquired in the second rectifier-control mode ("Yes" in Step S34 in FIG. 16) to thereby switch the control mode to the second inverter-control mode.

Specifically, the storage-battery control circuit 56 issues: an order to change the control target value for the DC-bus voltage of the DC-line bus 21 (300→400V) to the DC/AC control circuit 18; a suspension order to the discharging rectifier-mode control circuit 54; a startup order to the discharging inverter-mode control circuit 53; and an order to select the output of the discharging inverter-mode control circuit 53, to the switching circuit 55.

Upon receiving the suspension order, the discharging rectifier-mode control circuit 54 suspends while retaining various registers, control variables and the like. Further, the discharging inverter-mode control circuit 53 starts controlling with an initial value (see, Inverter-Control Mode, in FIG. 18(*c*)). As described previously, by switching the control mode, a current range (power range) that could not be managed by the second rectifier-control mode, can be managed by the second inverter-control mode. Thus, by adopting this control method, there is provided an effect that it is possible to cover a range up to a higher discharging current (discharging power), and as described previously, when the discharging current (discharging power) is small, it is possible to suppress ripple in the discharging current to be small, to thereby reduce deterioration caused on the storage battery 1.

Meanwhile, the circuit operation of the DC/DC conversion circuit 13 when a maximum current (maximum power) is outputted from the storage battery 1 in the second rectifier-control mode, is the same as the operation when power is outputted from the storage battery 1 in the second inverter-control mode with the command value "0". Thus, at the time the control is switched, it is unnecessary to temporarily suspend the operations of the first power converter 41 and the second power converter 42, thus providing an effect that the control method can be switched seamlessly and smoothly.

Meanwhile, in Embodiment 1, at the time the DC/DC conversion circuit 13 is switched to the second inverter-control mode, the control target value for the DC-bus voltage of the DC-line bus 21 is elevated from 300V to 400V. This is from the following reason. For example, when the target value for the discharging current is almost the same as the value of discharging current capable of being supplied by the second rectifier-control mode, if the control mode is switched without changing the DC-bus voltage value, a hunting of the control mode occurs that is specifically an unstable state of the control mode where the second rectifier-control mode and the second inverter-control mode are switched alternately.

Thus, in Embodiment 1, at the time of control-mode switching, the DC-bus voltage is elevated by a predetermined value (here, 100V) to thereby reduce the maximum value of the current (power) capable of being outputted in the second rectifier-control mode, so that it becomes possible to have a hysteresis at the time of control-mode switching. This prevents the hunting at the time of control-mode switching, providing an effect that the discharging control can be performed stably.

Note that in Embodiment 1, although the control target value for the DC-bus voltage at the time of control-mode switching is set to 400V, it is not limited thereto. A similar effect is accomplished, of course, when taking a value that is increased by a predetermined value from the control target value for the DC-bus voltage in the second rectifier-control mode before the switching. Note that, in the second inverter-control mode, generally, the ripple amount of the discharging current increases as the DC-bus voltage is elevated, as shown in FIG. 12. Therefore, it is needless to say that when the control target value is to be determined, it is desirably set to a maximum voltage in a range where the above hunting can be prevented.

As shown in FIG. 18 (*d*), the power storage amount in the storage battery 1 decreases gradually by the above discharging operation. The description of the subsequent operation will be followed also with reference to FIG. 17.

When the power storage amount of the storage battery 1 becomes a predetermined value (for example, 20%) or less, the HEMS gradually lowers the target value for the discharging current as shown in FIG. 18(*b*) in order to suspend the discharging from the storage battery 1. The discharging inverter-mode control circuit 53, as shown in the figure, gradually lowers the command value to thereby narrow down the discharging current. The storage-battery control circuit 56 monitors command-value information in the discharging inverter-mode control circuit 53. Then, it confirms whether or not the command value for the first power converter 41, that is the primary-side command value, becomes "0" (Step S38 in FIG. 17).

When confirmed at the time t3 in FIG. 18 that the command value for the first power converter 41 (a broken line in FIG. 18(*c*)) is "0" ("Yes" in Step S38), the storage-battery control circuit 56 confirms using the ammeter 16 whether or not the current from the storage battery 1 has become "0" (Step S39 in FIG. 17).

As described previously with FIG. 10(*b*), when the battery voltage of the storage battery 1 is higher than the DC-bus voltage, it is unable to narrow down the discharging current to "0" even if the command value in the discharging inverter-mode control circuit 53 becomes "0". Therefore, in Embodiment 1, when the discharging current is flowing even if the command value for the first power converter 41 in the discharging inverter-mode control circuit 53 becomes "0" ("No" in Step S39), the flow returns to Step S32, so that the control mode is switched to the second rectifier-control mode again to thereby continue controlling (see, a broken line in the period from time t3 to t4 in FIG. 18).

Consequently, in the case of switching the control mode to the second rectifier-control mode again to thereby continue controlling, the waveforms shown as broken lines in FIG. 18 are applicable.

In contrast, as shown by the actual lines at the same portions in FIG. 18, in the case where, according to the relationship between the DC-bus voltage and the battery voltage of the storage battery 1, the discharging current becomes "0" at the time the command value for the first power converter 41 becomes "0" ("Yes" in Step S39), the flow proceeds to Step S40. Then, when it is determined that the discharging is to be terminated because no particular command for continuing discharging is issued ("Yes" in Step 40), the storage-battery discharging control is terminated. In this case, the discharging control is terminated with the second inverter-control mode without returning to the second rectifier-control mode again.

The storage-battery control circuit 56, when determined a transition to the second rectifier-control mode, issues an order to the DC/AC control circuit 18 to change the control target for the DC-bus voltage of the DC-line bus 21 to the original 300V (Step S32 in FIG. 16), and also starts up the discharging rectifier-mode control circuit 54. At that time, it issues an order to the switching circuit 55 to output the control signal outputted from the discharging rectifier-mode control circuit 54. When the startup order is issued, the discharging rectifier-mode control circuit 54 starts controlling with the register values and the variable values retained at the previous termination of control, as initial values (time t3 in FIG. 18).

When the discharging control in the second rectifier-control mode is started, the storage-battery control circuit 56 monitors the command value in the discharging rectifier-mode control circuit 54 and the discharging current, and determines, when the command value and the discharging current become "0", that the discharging is completed ("Yes"

in Step S35 in FIG. 16), thereby to initialize the register and the variable related to the discharging control in the DC/DC control circuit 14 and to suspend the power conversion device after notifying the HEMS of the completion of the discharging.

Note that when the command value for the discharging current or the like changes after the transition to the second rectifier-control mode so that the command value outputted from the discharging rectifier-mode control circuit 54 becomes the setup value (maximum value) ("Yes" in Step S34 in FIG. 16), the flow moves to the second inverter-control mode again (Steps S36, S37).

As described above, at the time of discharging the storage battery 1, the power conversion device of Embodiment 1 starts up the DC/DC conversion circuit 13 with its control mode being the second rectifier-control mode, and then, when the target discharging current (power) cannot be obtained in the second rectifier-control mode, switches the control mode to the second inverter-control mode. Thus, when the target discharging current (power) is small, by discharging with the second rectifier-control mode, there is an effect that the ripple in the discharging current can be suppressed to be small, to thereby reduce deterioration caused on the storage battery 1 to be minimum.

Further, when the target discharging current (power) cannot be obtained, because said control mode is switched to the second inverter-control mode where the discharging current can be sufficiently acquired, there is an effect that it is possible to deal with the case where rapid discharging is required.

Meanwhile, in a system provided with a solar battery that can cooperate with the power system 3 and at the time of power blackout of the power system 3, when the power conversion device of Embodiment 1 performs a cooperative operation with the solar battery so as to supply power to an in-house load, there is provided the following effect. When the power generated by the solar battery is steeply dropped due to rapid change in the amount of solar radiation, even if all of the power to be supplied to the home-electronics load in the house cannot be discharged from the storage battery 1 in the second rectifier-control mode, it is possible by seamlessly switching to the second inverter-control mode, to increase the discharging power amount from the storage battery 1. Thus, at the time of power blackout, even when the power generated by the solar battery is dropped due to occurrence of rapid change in the amount of solar radiation, the in-house load can be used stably.

Note that in Embodiment 1, although the initial values of the discharging inverter-mode control circuit 53 and the discharging rectifier-mode control circuit 54 are not yet mentioned, they will be described below.

As described previously, in order to prevent arm short-circuit, a dead time is generally provided in the control signal for driving the switching device. Thus, at the time of switching from the second rectifier-control mode to the second inverter control mode, in a period where the command value cannot acquire a pulse width equal to or more than the time defined by the dead time, the control signal supplied to the switching device becomes "0". Accordingly, at the time the control is switched, there emerges a time period where the discharging current amount (power amount) does not vary.

In particular, in Embodiment 1, the control target value for the DC-bus voltage of the DC-line bus 21 is switched at the time of control-mode switching, and thus, in the case of switching, for example, from the second rectifier-control mode to the second inverter-control mode, the discharging current becomes smaller in the period of the dead time because the DC-bus voltage is elevated.

Thus, according to Embodiment 1, it is configured so that the initial values of the respective registers and the variables that are used for controlling the discharging inverter-mode control circuit 53 and the discharging rectifier-mode control circuit 54, are set as initial values in consideration of the dead time (values each including an offset corresponding to the dead time). This provides an effect that, at the time of control-mode switching, it is possible to make shorter or to completely negate a time period due to the dead time where the discharging current amount does not vary, so that the control-mode switching can be performed successively.

Meanwhile, each of the switching devices 31a to 31d and 32a to 32d has a time until it is switched on (turn-on time), and a time until it is switched off (turn-off time). It is configured so that the initial values of the respective registers and the variables that are used for controlling the discharging inverter-mode control circuit 53 and the discharging rectifier-mode control circuit 54, are given in consideration of these turn-on time and turn-off time. This provides an effect that, at the time of control-mode switching, it is possible to make shorter or to completely negate a time period due to the turn-on time or turn-off time where the discharging current amount does not vary, so that the control-mode switching can be performed successively.

Moreover, because the control target value for the DC-bus voltage of the DC-line bus 21 is switched at the time of control-mode switching, there is an effect that the hunting that occurs at the time of control-mode switching is suppressed. Meanwhile, when the DC-bus voltage is lower than the battery voltage of the storage battery 1 in the inverter-control mode, it is unable to narrow down the discharging current to "0" even if the command value in the discharging inverter-mode control circuit 53 is set to "0"; in this case, however, the control mode is switched to the second rectifier-control mode again, thus causing an effect that the discharging current can be finally brought to "0".

Further, in Embodiment 1, at the time of switching from the second inverter-control mode to the second rectifier-control mode, although the discharging current that is an output from the storage battery 1 is determined according to the output of the ammeter 16, this is not limitative. For example, it may be determined, of course, from the DC-bus voltage of the DC-line bus 21 and the battery voltage of the storage battery 1. Further, since the ammeter 16, etc., is generally provided with an error, the discharging current value etc., to be determined may be, of course, a value in which errors of the ammeter or like sensors are predictively incorporated. Furthermore, the determination whether to switch the control mode may be made, of course, according to the discharging current, the DC-bus voltage of the DC-line bus 21 and the battery voltage of the storage battery 1, in combination.

Note that in Embodiment 1, as described previously, because the rectifier-control mode is used as much as possible, the number of switching times of the switching devices 31a to 31d and 32a to 32d is reduced, and thus there is an effect that unwanted power loss is suppressed so that charging/discharging control of the storage battery 1 can be performed efficiently.

Specifically, when a maximum power amount can be acquired and the DC-bus voltage of the DC-line bus 21 falls in the control range, the charging/discharging control is performed basically in the rectifier-control mode. As described previously, in the case of the inverter-control mode, the switching devices 31a to 31d and 32a to 32d always make their switching as shown in FIG. 4 and FIG. 6. Contrarily, in the rectifier-control mode, the switching devices that are either the switching devices 31a to 31d or the switching devices 32a to 32d do not make switching but perform operations only as a diode rectifier as shown in FIG. 5 and FIG. 7. Thus, the rectifier-control mode is lower in switching loss of switching devices, so that the power conversion can be performed efficiently. Thus, in Embodiment 1, because unwanted charging/discharging control by the inverter-control mode is reduced, there is an effect that unwanted power loss is suppressed so that charging/discharging control of the storage battery 1 can be performed efficiently.

Further, in Embodiment 1, because the rectifier-control mode and the inverter-control mode are switched seamlessly as described previously, it is possible to exchange power between the storage battery 1 and the DC/AC conversion circuit 17 regardless of the battery voltage of the storage battery 1 and the DC-bus voltage of the DC-line bus 21. Thus, the insulation transformer 36 is allowed to have a simplified configuration with a fixed turn ratio and the insulation transformer 36 can be used at its optimal point, so that there is an effect that an unwanted degradation in efficiency can be reduced.

Further, because the turn ratio of the insulation transformer 36 can be fixed, there is an effect that the insulation transformer 36 has not to be made unnecessarily large in size, and its cost can be reduced.

Note that in Embodiment 1, although description has been made about the charging/discharging control when power is supplied from the power system 3, this is not limitative. Even at the time of power blackout, since the rectifier-control mode and the inverter-control mode are used in a switched manner according to the charging or discharging power amount, there is an effect that the ripple in the current can be suppressed to be minimum.

Note that in Embodiment 1, for simplifying explanation, description has been made about the power conversion device that solely uses the storage battery 1; however, this is not limitative, and a similar effect is accomplished, of course, in a system with a configuration in which a solar battery or a wind-power generator is further provided as a distributed power source utilizing natural energy.

Further, in Embodiment 1, description has been made about a case of using a stationary battery as the storage battery 1; however, this is not limitative, and a similar effect is accomplished, of course, even using a battery for an electric-powered vehicle. Further, in Embodiment 1, description has been made about a case of using a lithium-ion battery as the storage battery 1, this is not limitative. Further, the storage-battery management unit 2 is configured as incorporated in the storage battery 1; however, this is not limitative, and a similar effect is accomplished even when a main body of the power conversion device 10 is configured to manage information of the storage battery 1.

Furthermore, in Embodiment 1, for ease of explanation, description has been made assuming that various controls (charging control/discharging control, inverter-control mode/rectifier-control mode) are implemented by hardware; however, this is not limitative, and a similar effect is accomplished, of course, even when a central integrated circuit (CPU) is mounted so that all of circuits related to the various controls or part of the circuits are implemented by software operating on the CPU.

Further, it is, of course, allowable to allocate the functions of the respective circuits between software and hardware to thereby implement the same functions.

Note that in Embodiment 1, the method shown in FIG. 4 to FIG. 7 is described as a control method of the insulated-type DC/DC conversion circuit 13; however, this is not limitative. For example, in the case of controlling by the inverter-control mode, the method may be configured such that the amount of power to be charged in the storage battery 1 or the amount of power to be discharged from the storage battery 1 is controlled by controlling the phases of the control signal with the Duty ratio 50% supplied to the switching devices 31a to 31d and the control signal with the Duty ratio 50% supplied to the switching devices 32a to 32d.

It should be noted that any modification of the embodiment and any omission in the embodiment may be made appropriately in the present invention without departing from the scope of the invention.

The invention claimed is:

1. A power conversion device which comprises: a first power converter and a second power converter each having switching devices, and each capable of an inverter operation for performing bidirectional DC/AC conversion by on/off driving the switching devices and a rectifier operation for converting an alternating current to a direct current by turning off the switching devices; an insulation transformer that connects an AC-side terminal of the first power converter with an AC-side terminal of the second power converter; and a control circuit that controls the first and second power converters; and which performs bidirectional DC-power conversion between a first DC-voltage source to which a DC-side terminal of the first power converter is connected and a second DC-voltage source to which a DC-side terminal of the second power converter is connected;

wherein the control circuit includes four control modes of a first rectifier-control mode, a first inverter-control mode, a second rectifier-control mode, and a second inverter-control mode;

wherein, at the time of supplying power from the first DC-voltage source to the second DC-voltage source, the control circuit utilizes the first rectifier-control mode in which the first power converter is placed under an output variable control according to the inverter operation while the second power converter is controlled to be according to the rectifier operation, and when a command value for controlling the first power converter becomes a first setup value or more, the control circuit switches the mode to the first inverter-control mode in which the first power converter is placed under an output fixed control according to the inverter operation while the second power converter is placed under an output variable control according to the inverter operation; and wherein, at the time of supplying power from the second DC-voltage source to the first DC-voltage source, the control circuit utilizes the second rectifier-control mode in which the second power converter is placed under an output variable control according to the inverter operation while the first power converter is controlled to be according to the rectifier operation, and when a command value for controlling the second power converter becomes a second setup value or more, the control circuit switches the mode to the second inverter-control mode in which the second power converter is placed under an output fixed control according to the inverter operation while the first power converter is placed under an output variable control according to the inverter operation.

2. The power conversion device of claim 1, wherein, when a voltage of the first DC-voltage source is higher than a voltage of the second DC-voltage source at the time of supplying power from the first DC-voltage source to the second DC-voltage source, and when an output to the second DC-voltage source does not reach zero in the first inverter-control mode even if the control circuit takes a control for causing an output of the second power converter to be zero, the control circuit controls the first and second power converters after switching the first inverter-control mode to the first rectifier-control mode again.

3. The power conversion device of claim 1, wherein, when a voltage of the second DC-voltage source is higher than a voltage of the first DC-voltage source at the time of supplying power from the second DC-voltage source to the first DC-voltage source, and when an output from the second DC-voltage source does not reach zero in the second inverter-control mode even if the control circuit takes a control for causing an output of the first power converter to be zero, the control circuit controls the first and second power converters after switching the second inverter-control mode to the second rectifier-control mode again.

4. The power conversion device of claim 1, which comprises a DC-voltage control circuit that controls a voltage of the first DC-voltage source within a predetermined voltage range,
wherein, at the time of supplying power from the first DC-voltage source to the second DC-voltage source, when the control circuit controls the first and second power converters by the first rectifier-control mode, the DC-voltage control circuit controls the voltage of the first DC-voltage source to a setup upper limit value.

5. The power conversion device of claim 1, which comprises a DC-voltage control circuit that controls a voltage of the first DC-voltage source within a predetermined voltage range,
wherein, at the time of supplying power from the second DC-voltage source to the first DC-voltage source, when the control circuit controls the first and second power converters by the second rectifier-control mode, the DC-voltage control circuit controls the voltage of the first DC-voltage source to a setup lower limit value.

6. The power conversion device of claim 1, which comprises a DC-voltage control circuit that controls a voltage of the first DC-voltage source within a predetermined voltage range,
wherein, at the time of supplying power from the first DC-voltage source to the second DC-voltage source, when the control circuit controls the first and second power converters after switching from the first rectifier-control mode to the first inverter-control mode, the DC-voltage control circuit controls the voltage of the first DC-voltage source to a value that is lower by a predetermined amount than that before the switching.

7. The power conversion device of claim 1, which comprises a DC-voltage control circuit that controls a voltage of the first DC-voltage source within a predetermined voltage range,
wherein, at the time of supplying power from the second DC-voltage source to the first DC-voltage source, when the control circuit controls the first and second power converters after switching from the second rectifier-control mode to the second inverter-control mode, the DC-voltage control circuit controls the voltage of the first DC-voltage source to a value that is higher by a predetermined amount than that before the switching.

8. The power conversion device of claim 2, which comprises a DC-voltage control circuit that controls the voltage of the first DC-voltage source within a predetermined voltage range,
wherein, at the time of supplying power from the first DC-voltage source to the second DC-voltage source, when the control circuit controls the first and second power converters after switching from the first inverter-control mode to the first rectifier-control mode, the DC-voltage control circuit controls the voltage of the first DC-voltage source to a value that is higher by a predetermined amount than that before the switching.

9. The power conversion device of claim 3, which comprises a DC-voltage control circuit that controls the voltage of the first DC-voltage source within a predetermined voltage range,
wherein, at the time of supplying power from the second DC-voltage source to the first DC-voltage source, when the control circuit controls the first and second power converters after switching from the second inverter-control mode to the second rectifier-control mode, the DC-voltage control circuit controls the voltage of the first DC-voltage source to a value that is lower by a predetermined amount than that before the switching.

10. The power conversion device of claim 1, which comprises a DC-voltage control circuit that controls a voltage of the first DC-voltage source within a predetermined voltage range,
wherein the first DC-voltage source is a DC/AC conversion circuit whose AC-side terminal is connected to a power system and whose voltage at its DC-side terminal is controlled by the DC-voltage control circuit.

11. The power conversion device of claim 1, wherein the second DC-voltage source is a storage battery.

12. The power conversion device of claim 1, wherein the first and second power converters each include four switching devices as the switching device that are configured in two arms, and
wherein the control circuit controls the first or second power converter using a Duty ratio of each of the switching devices as the command value, and the first and second setup values are each set according to the Duty ratio.

13. The power conversion device of claim 12, wherein the control circuit, when controlling the first or second power converter to be according to the rectifier operation, sets the command value corresponding to the Duty ratio of each of the four switching devices to zero.

14. The power conversion device of claim 12, wherein the control circuit, when placing the first or second power converter under the output fixed control according to the inverter operation, sets the command value corresponding to the Duty ratio of each of the four switching devices to 0.5.

* * * * *